US007162363B2

(12) United States Patent
Chinitz

(10) Patent No.: US 7,162,363 B2
(45) Date of Patent: Jan. 9, 2007

(54) TRAVEL ROUTE MAPPING

(76) Inventor: Leigh M. Chinitz, 28 Bay View Rd., Wellesley, MA (US) 02482

( * ) Notice: Subject to any disclaimer, the term of this patent is extended or adjusted under 35 U.S.C. 154(b) by 0 days.

(21) Appl. No.: 11/020,829

(22) Filed: Dec. 22, 2004

(65) Prior Publication Data

US 2006/0136123 A1    Jun. 22, 2006

(51) Int. Cl.
*G01C 21/26* (2006.01)
(52) U.S. Cl. ............... 701/202; 701/207; 701/209; 340/995.19; 342/357.13
(58) Field of Classification Search .......... 701/209, 701/210, 208, 211, 201, 207, 202, 200, 213; 340/990, 988, 995.21, 995.19, 995.2, 995.15; 342/357.13, 357.06; 180/167; 318/587; 345/440; 702/150; 73/178 R
See application file for complete search history.

(56) References Cited

U.S. PATENT DOCUMENTS

| 5,450,325 | A |   | 9/1995 | Rodriguex |
| 5,559,707 | A | * | 9/1996 | DeLorme et al. ........... 701/200 |
| 5,802,492 | A |   | 9/1998 | DeLorme et al. |
| 6,081,609 | A |   | 6/2000 | Narioka |
| 6,119,065 | A |   | 9/2000 | Shimada |
| 6,148,090 | A |   | 11/2000 | Narioka |
| 6,148,260 | A |   | 11/2000 | Musk et al. |
| 6,188,957 | B1 |   | 2/2001 | Bechtolsheim et al. |
| 6,192,314 | B1 | * | 2/2001 | Khavakh et al. ............ 701/209 |
| 6,199,014 | B1 |   | 3/2001 | Walker et al. |
| 6,208,934 | B1 |   | 3/2001 | Bechtolsheim et al. |
| 6,321,158 | B1 |   | 11/2001 | DeLorme et al. |
| 6,339,746 | B1 |   | 1/2002 | Sugiyama et al. |
| 6,374,182 | B1 | * | 4/2002 | Bechtolsheim et al. ..... 701/209 |
| 6,438,490 | B1 |   | 8/2002 | Ohta |
| 6,459,986 | B1 |   | 10/2002 | Boyce et al. |
| 6,477,526 | B1 |   | 11/2002 | Hayashi et al. |
| 6,490,522 | B1 |   | 12/2002 | Sugiyama et al. |
| 6,580,441 | B1 | * | 6/2003 | Schileru-Key ............... 715/805 |
| 6,622,089 | B1 | * | 9/2003 | Hasegawa et al. .......... 701/211 |
| 6,748,317 | B1 |   | 6/2004 | Maruyama et al. |
| 6,820,005 | B1 | * | 11/2004 | Matsuda et al. ............ 701/211 |
| 6,917,878 | B1 | * | 7/2005 | Pechatnikov et al. ....... 701/210 |
| 2004/0236498 | A1 | * | 11/2004 | Le et al. ..................... 701/200 |

* cited by examiner

*Primary Examiner*—Thomas Black
*Assistant Examiner*—Marie A. Weiskopf
(74) *Attorney, Agent, or Firm*—Hamilton, Brook, Smith & Reynolds, P.C.

(57) ABSTRACT

A method and system for providing a closed route for travel features a database having geographic information and input information including a starting point and a desired route length. The geographic information from the database and the input information are processed to define an outbound path from the starting point to a turning point, the turning point determined based on the desired route length, and to define an inbound path from the turning point to the starting point, the outbound path and the inbound path together defining the closed route. A representation of the closed route may be output as a static map, interactive map or a turn-by-turn listing.

38 Claims, 27 Drawing Sheets

Welcome

If you are already familiar with this application proceed directly to the form, below.
If, however, you are new to this application and would like a brief introduction, check out our Introduction page.

| *Required* Route Information: | |
|---|---|
| Starting Location Address: e.g. 100 North Maple Drive S.E. 00312 | 1001 North Maple Drive, S.E. — 302 |
| Starting Location State: e.g. Hawaii | Hawaii — 304 |
| Starting Location Zip Code: e.g. 00321 | 00321 — 306 |
| Requested Route Length: | _____ miles — 308 |

| *Optional* Additional Features: | | | |
|---|---|---|---|
| Return Route (help) | ○ Same as outbound | ● Do Not Direct Route ○ Choose Direction ○ Choose Targets | ○ New route |
| Select a mode of directing the route (help) | | | |
| Route Initial Direction | ● None ○ North ○ South ○ East ○ West | | |

Points of Interest Along the Way:

- Point of Interest #1 N/A
- Point of Interest #2 N/A
- Point of Interest #3 N/A
- Point of Interest #4 N/A
- Point of Interest #5 N/A Probability of taking the street in the chosen direction (help)  80.0 %

Probability of remaining on the street you are currently on (help)  90.0 %

What is the smallest size loop, you will accept for recrossing your own path, in miles? (help)  1.0  miles Return an answer that is within no more  100  miles of the requested length. (help) than Submit   Reset

Figure 27

TRAVEL ROUTE MAPPING

BACKGROUND OF THE INVENTION

The value of computer-generated maps is undisputable. In the past, to get directions from one place to another, a person could either ask someone else for directions or consult an existing, usually paper, map of the area. Detailed, street-by-street directions were often only available through the services of a company like the Automobile Association of America, which would prepare a Trip Tik® of the route. More recently, anyone with an Internet connection can visit a web site like MapQuest, Expedia, Yahoo, etc. and get customized, point-to-point directions from any starting address to any destination address, at least within the United States.

SUMMARY OF THE INVENTION

People that engage in hiking, bicycling, and other exercise activities often travel routes that begin and end at the same location and have a desired length. For example, a person may want to start at home, bicycle for 10 miles, and end back at home. The well-known point-to-point mapping applications are not suited to provide maps or turn-by-turn directions for such "closed routes."

Accordingly, a method of providing a closed route for travel includes providing a database having geographic information and receiving input information including a starting point and a desired route length. The geographic information from the database and the input information are processed to define an outbound path from the starting point to a turning point, the turning point determined based on the desired route length, and to define an inbound path from the turning point to the starting point, the outbound path and the inbound path together defining the closed route. A representation of the closed route may be output a suitable output format, such as a static map, interactive map or a turn-by-turn listing.

The geographic information may include a plurality of road segments each having a road segment length, wherein processing to define the outbound path may include (a) selecting a road segment corresponding to the starting point as the current road segment; (b) cumulating the road segment length corresponding to the current road segment; (c) evaluating one or more selection criteria to select a road segment from among one or more road segments connected to the current road segment; (d) setting the selected road segment as the current road segment; (e) repeating (b), (c) and (d) until the cumulated road segment length plus the distance from the current road segment to the starting point is greater than or equal to the desired route length, the turning point corresponding to the most recently selected road segment; and (f) defining the outbound path from the series of selected road segments.

The processing to define the inbound path may include (a) selecting the road segment corresponding to the turning point as the current road segment; (b) evaluating one or more selection criteria to select a road segment from among one or more road segments connected to the current road segment; (c) setting the selected road segment as the current road segment; (d) repeating (b) and (c) until the road segment corresponding to the starting point is selected; and (e) defining the inbound path from the series of selected road segments.

The selection criteria may include selecting at random from among one or more road segments connected to the current road segment.

The road segments may each have a road type, with the input information further including a road type preference, and the selection criteria including selecting from among one or more road segments connected to the current road segment based on the road type preference.

The input information may further include a road continuity preference, with the selection criteria including selecting from among one or more road segments connected to the current road segment based on the road continuity preference.

The road segments may each have a direction, and the input information may further include a direction preference, and the selection criteria including selecting from among one or more road segments connected to the current road segment based on the direction preference.

The input information may further include one or more intermediate target points, with the selection criteria including selecting from among one or more road segments connected to the current road segment based on proximity or direction to one or more of the intermediate target points.

According to another aspect, another closed route may be defined if the absolute value of the difference between the length of the currently defined closed route and the desired route length is greater than a route length threshold.

The geographic information may include a plurality of road segments, wherein processing to define the outbound and inbound paths may include selecting a first series of connected road segments from the starting point to the turning point; and selecting a second series of connected road segments from the turning point to the starting point. Selecting may include evaluating one or more selection criteria to select a road segment from among one or more road segments connected to a current road segment.

According to another aspect, the defined closed route may be evaluated for the presence of loops or detours so as to remove from the defined closed route any loops or detours having loop or detour length less than a threshold.

A method of providing a route for travel includes providing a database having geographic information including plural road segments; receiving input information including a starting point and a target point; and processing the geographic information from the database and the input information to select a series of connected road segments from the starting point to the target point based on one or more selection criteria that includes random selection.

A system for providing a closed route for travel includes a database having geographic information and an input unit for receiving input information including a starting point and a desired route length. A road selection unit extracts geographic information from the database. A route calculation unit processes the extracted geographic information and the input information to define an outbound path from the starting point to a turning point, the turning point determined based on the desired route length, and to define an inbound path from the turning point to the starting point, the outbound path and the inbound path together defining the closed route. An output unit may output a representation of the closed route.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 27 illustrates a screen shot of a graphical user interface for entering input information for the travel route mapping approach of the present invention.

DETAILED DESCRIPTION OF THE INVENTION

A description of preferred embodiments of the invention follows.

The travel route mapping approach described herein is based on the premise that a user desires to generate a route, starting and ending at the same location, and having a specified length. This can be for any purpose, but examples would be a bicyclist wanting to take a ride of a given length for exercise, or a jogger looking to run a specific distance. The travel route mapping algorithm described herein, therefore, creates a set of directions for traveling along existing roads, as long as those roads are represented in a suitable database. The distinguishing characteristics of the directions created are that they begin at a chosen location, that they travel for a specified distance before ending at the same place, and that an element of randomness exists in the creation of the directions. That is, given the same input parameters, the algorithm is not guaranteed to return precisely the same set of traveling directions each time it is invoked. In fact, the advantage of the algorithm is that is almost guaranteed not to return the same directions each time.

Overview

Figure 1:
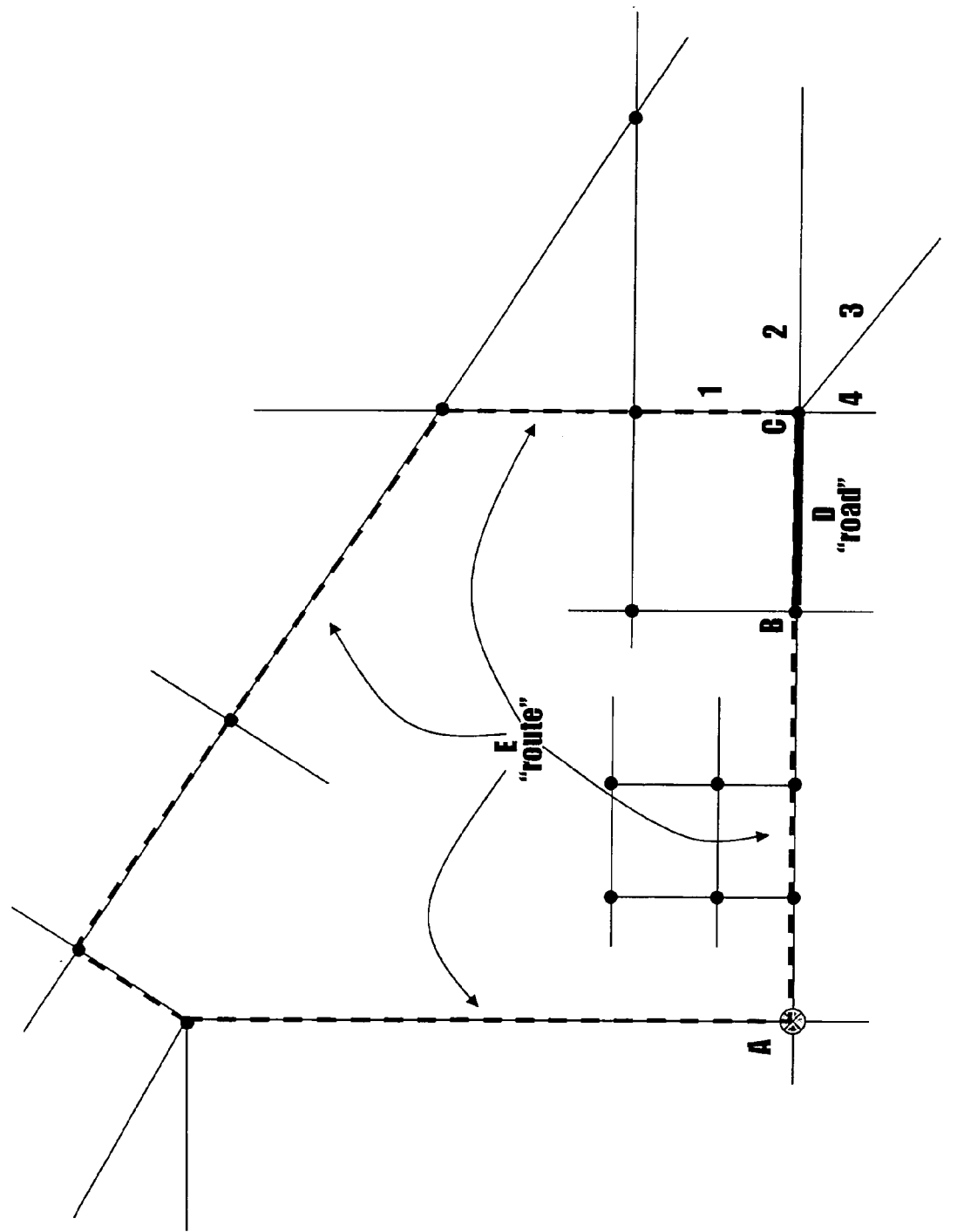
FIG. 1 is a diagram that shows elements of the travel route mapping approach of the present invention.

What follows is a description of the different modes of operation of the algorithm disclosed herein. In the descriptions that follow we will refer often to the concept of "routes" and "roads." For the purposes herein, the word "route" refers to the final output of the algorithm—a defined path, using actual, existing roads, that starts at a specified location and, after traveling a requested distance, returns to that location. A "road" refers to a specific road segment that the travel route mapping algorithm may choose to include as part of this route. Unlike the common understanding of the word "road", a road in this description may be only a small section of an entire road—the portion between two cross streets, for example. (So while Main Street may extend for 2 miles, the section of Main Street between Maple Street and Birch Street may be only 0.1 miles long. It is this 0.1 mile section that we refer to as a "road" or road segment.) Roads, then, are the atomic elements that constitute routes herein, and it is the creation of routes with which this algorithm is concerned. The details of these elements are illustrated in FIG. 1.

As noted, the travel route mapping algorithm creates a route of a specified length, beginning and ending at the same point. This beginning and ending point is shown in FIG. 1 as point A. The closed route is shown as the dashed line, and labeled "E".

The travel route mapping algorithm operates using a database of road information and, using that road information, a route is created. As shown in FIG. 1, roads are defined to be elements of streets from one intersection to the next. All of the heavy dots, such as those at points B and C are intersections, and the segment from B to C (shown as a heavy line) is an example of a road. Route "E" is comprised of a number of road segments, including the road segment from B to C. A "path", when that term is used, refers to a set of road segments that do not comprise an entire route. So, for example, a complete route comprises an outbound path and a return, or inbound, path.

At each intersection some number of options are available to the algorithm for the next road to be added to the route. For example, if the route includes the road segment from point B to point C, then the next options at point C would include the roads labeled as 1, 2, 3, and 4 in FIG. 1. As will be discussed below, there are several ways to choose among these various options.

Basic Operation

Figure 2:
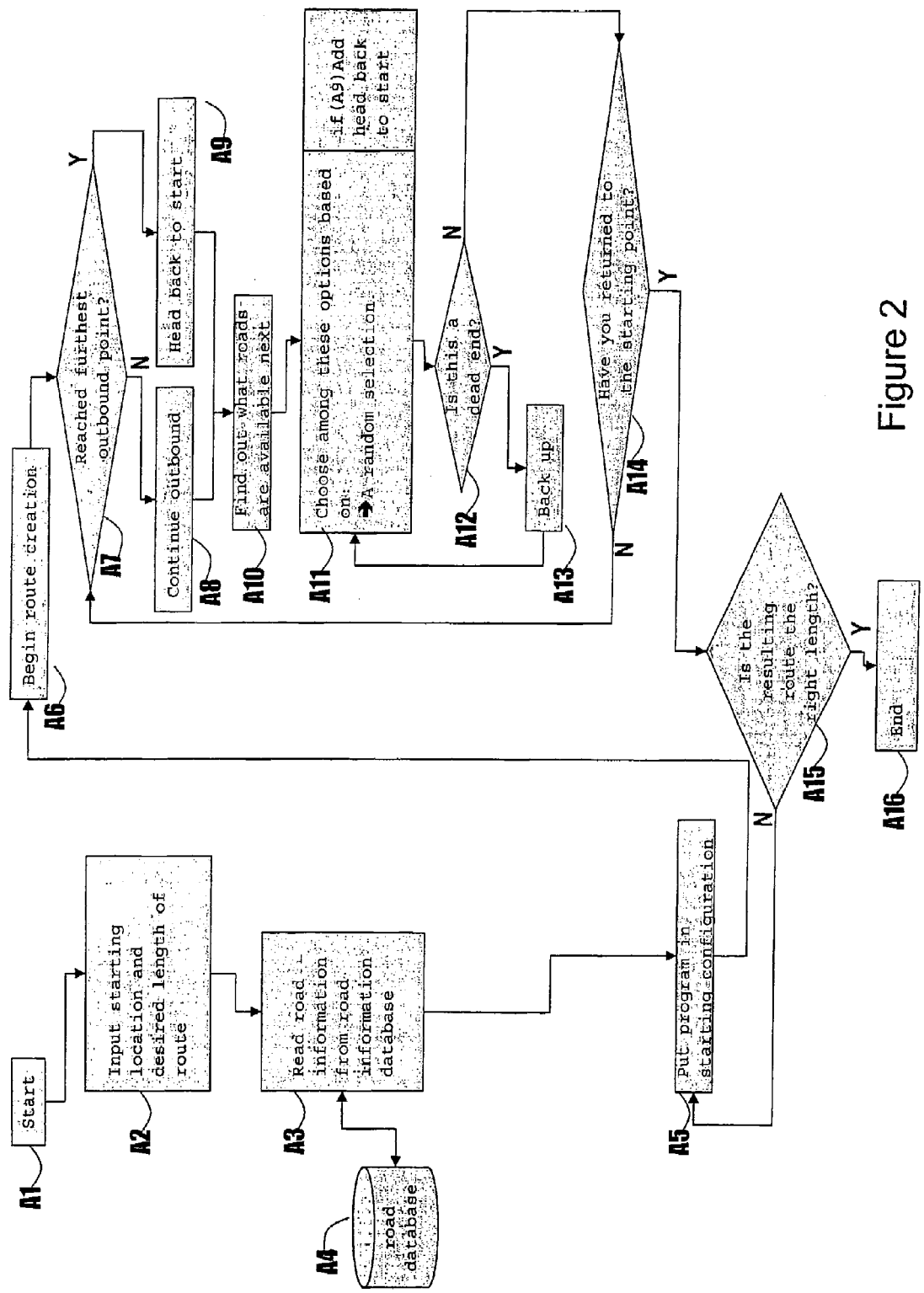
FIG. 2 illustrates a flow diagram of a travel route mapping algorithm with a basic mode of operation in accordance with the present invention.

In its basic mode of operation, the travel route mapping algorithm operates as shown in the flow diagram of FIG. 2. As mentioned earlier, the directions begin and end at the same location, and travel for a requested distance. The algorithm begins at position A1. At position A2, the user is asked to input the only information that is required for the algorithm to operate: the location of the starting (and, therefore, ending) position, and the length of the desired route.

The algorithm makes use of a database of road information. In one embodiment this can be the TIGER/Line files (Topologically Integrated Geographic Encoding and Referencing system) from the United States Census Bureau, but the travel route mapping algorithm is general enough to work with any suitable database of road information. At A3, the algorithm reads the road information from the database, A4.

A5 indicates that the algorithm sets itself to begin the main computation. This is important because it may become necessary, as will be described later, for the algorithm to return to this point, and re-set itself, if the route it finds is not acceptable.

At A6, the algorithm begins the creation of a new route. The first task, at A7, is to determine whether or not the route that has been created up until this point has reached the furthest outbound point. The "furthest outbound point" is defined to be the point at which, if the route were to include the distance between its current location and the starting location, the total route length (the sum of the length up until the furthest outbound point, and the straight line distance between that point and the starting location) would equal the length of the desired route. For example, in the basic operation shown in FIG. 2 the user, at A2, may enter 20 miles for the desired route length. While creating the route, the algorithm will continue selecting new paths until an outbound point is reached such that the sum of the length to this point, plus the straight line distance back to the starting point is equal to 20 miles. This is indicated by A8. Once the algorithm has reached a point at the furthest outbound distance, it will then choose paths that head back towards the starting point, as in A9.

The process of choosing these paths, either in the outbound direction (A8) or heading back to the start, the return direction, (A9) is described in the next set of blocks. Since the algorithm uses a road database (A4) to create the routes, there are a finite number of options available to the algorithm when it is on any given road (see FIG. 1). So, in A10, the algorithm determines the options at the current position. It then must choose among those possible options, and this is depicted by the operation in A11.

In the basic mode of operation depicted here, the algorithm chooses among the possible options by selecting an option at random. Other embodiments of the algorithm will differ primarily in the manner of selecting among these options, and several other techniques will be described later. Once an option is chosen, the algorithm checks to see if there are any possibilities to continue the route, A12. If there are no possibilities, it means that the algorithm has reached a dead end, and would have to turn around and head back. Since this is not an optimal solution, the algorithm rejects this option and backs up to the previous road, A13. This loop of operations (select an option, check to see that it is not a dead end and, if it is, back up, or A11, A12, A13) continues until an acceptable next option is found.

One slightly subtle point has to do with how the operation at A11 relates to the answer to A7 (i.e., "Has the furthest outbound point been reached?"). As shown in the flow diagram, the algorithm operates differently if it has already reached the furthest outbound point on the route. The two sections of the A11 operation depict the different operations. So, in this example of basic operation, A11 shows that on the outbound part of the route, roads are selected at random to add to the route. However, on the return part of the route, a preference to head back to the starting point must also be included in order to cause the route to close. This preference to head back to the start can be operated in conjunction with the choice of random road. They are not entirely mutually exclusive operations. Of course, the selection of roads is no longer, at that point, completely random since the selections will be weighted in favor of returning to the starting point.

Although the specifics of this technique might vary among implementations, in an example implementation this "preference" to head back to the starting point might change as a function of the total route length. For example, when the route begins to head towards the starting location (that is, it has reached the furthest outbound point and, so, now flows through A9), the algorithm at A11 may decide that with some low probability (say 10%) it will choose the road in the direction of the starting location, but with 90% probability it will choose a road completely at random. As the total length of the route increases and gets closer to the desired route length, the algorithm may decide that with very high probability (say 90%) it will choose the road in the direction of the starting point. If the total route length exceeds the desired route length, the algorithm may decide to choose the road in the direction of the starting location 100% of the time. The goal is to maintain the element of randomness, while still creating a route of the desired length. These percentages are only illustrative; this mechanism of a sliding scale of weighting can be implemented in any number of different ways.

Once an acceptable next option is found, the algorithm checks to see if it has returned to its original starting point, A14. If it has not, the algorithm selects a new road to add to the current route by continuing to A7, the point at which it decides to head either outbound, or back to the start. This loop, from A7 to A14, constitutes the route creation part of the algorithm.

Once the route creation has concluded by arriving back at the starting location, the algorithm checks to make sure that the resulting route is of the length requested. This is represented by A15. Since the algorithm makes use of a road database, and can only create a route whose length is the sum of road segments that exist in the database, it is not likely that the resulting route will be exactly the desired length that had been input at A2. The algorithm must decide if the actual length is close enough to the desired length to constitute an acceptable route. If it is "close enough" the algorithm finishes at A16. If it is not, the algorithm returns to A5 in order to reset itself and perform again the route creation section.

There are several other modes of operation that will be described next, after which a specific example of route creation will be used to clarify some of the descriptions given here, and in the next sections.

Other Modes of Operation

The operation described above is the most basic operation of the travel route mapping algorithm. There are a number of additional modes of operation that can enhance the solution described. These additional modes are discussed in the next sections.

Preference for Choosing Roads of Certain Types

One useful enhancement to the solution described so far is to allow the algorithm to weight the types of roads it uses in creating its routes. For example, in the TIGER/Line files, roads are classified as Primary Highways with Limited Access, Primary Roads without Limited Access, Secondary and Connecting Roads, Local, Neighborhood, and Rural Roads, and more besides. In addition, even these main classes are further subdivided. It is possible to permit the algorithm to assign certain weights to each of these types of roads. Road types can be excluded completely (a weight of zero), while other road types can be preferred (a weight of more than one.) This enhancement is shown in the flow diagram of FIG. 3.

Figure 3:
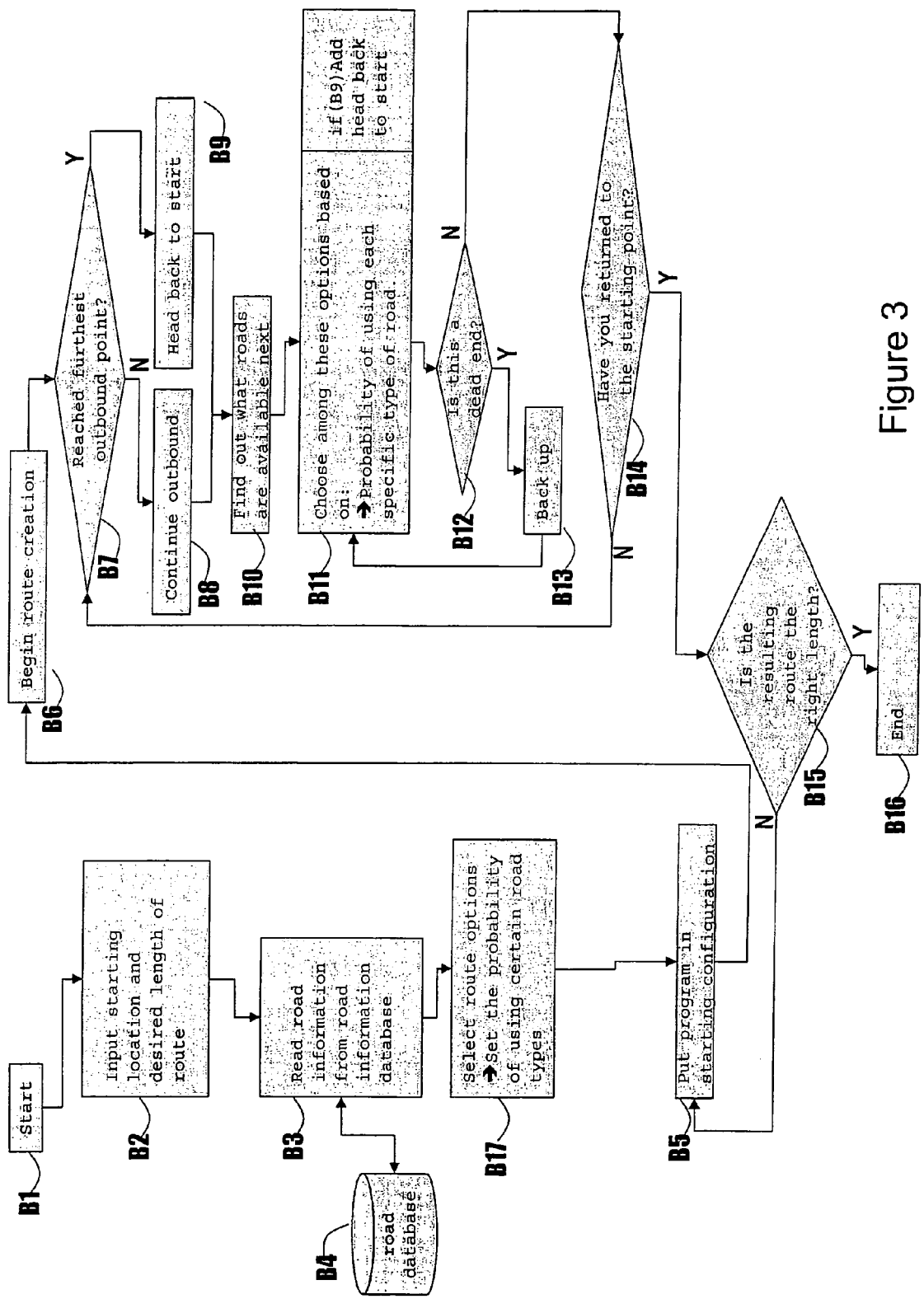
FIG. 3 illustrates a flow diagram of a travel route mapping algorithm with a preference for choosing roads of certain types.

Almost all of the operations described in FIG. 2 are contained also in FIG. 3; that is, the operations A1, A2, A3, . . . are mirrored by B1, B2, B3 . . . An additional operation is shown in B17, which occurs just after B3. Once the road information is read from the road database, the algorithm requests more input from the user. In this case, the algorithm requests weighting factors for the various types of roads in the database. These probabilities are used in B11. Unlike A11, in which the algorithm chooses among possible options at random, in B11 the algorithm selects roads to add to its route by selecting among the possible choices based on the weights assigned to each road type. As previously, the B11 operation depends on the answer to B7. Once the furthest outbound point has been passed, the algorithm will still weight its choice of particular road types, but when choosing among the options it will weight its choices such that the route heads back to the starting point.

Preference for Remaining on the Same Road

Another enhancement allows the algorithm to remain preferentially on a road with the same name as the road it is currently on. As described in earlier sections, the algorithm can choose new roads to add to its route either by choosing roads at random, or by choosing among roads based on the weights assigned to those road types. Also as discussed earlier, what we might think of as a road in everyday life (say, Main Street), may be represented in the database by many different road segments.

A further enhancement is to require the route to choose a road with the same name as the road that it is currently on, in the cases in which that is an option. So, for example, there may be a number of roads all of the same type from which to choose, and with this enhancement the algorithm will choose to remain on a road with the same name as the one it is currently on if it can. The effect of this will be to create routes that tend to stay on physical roads (e.g. Main Street) rather than being prone to turn off of them at any intersection. This is shown in the flow diagram of FIG. 4.

Figure 4:
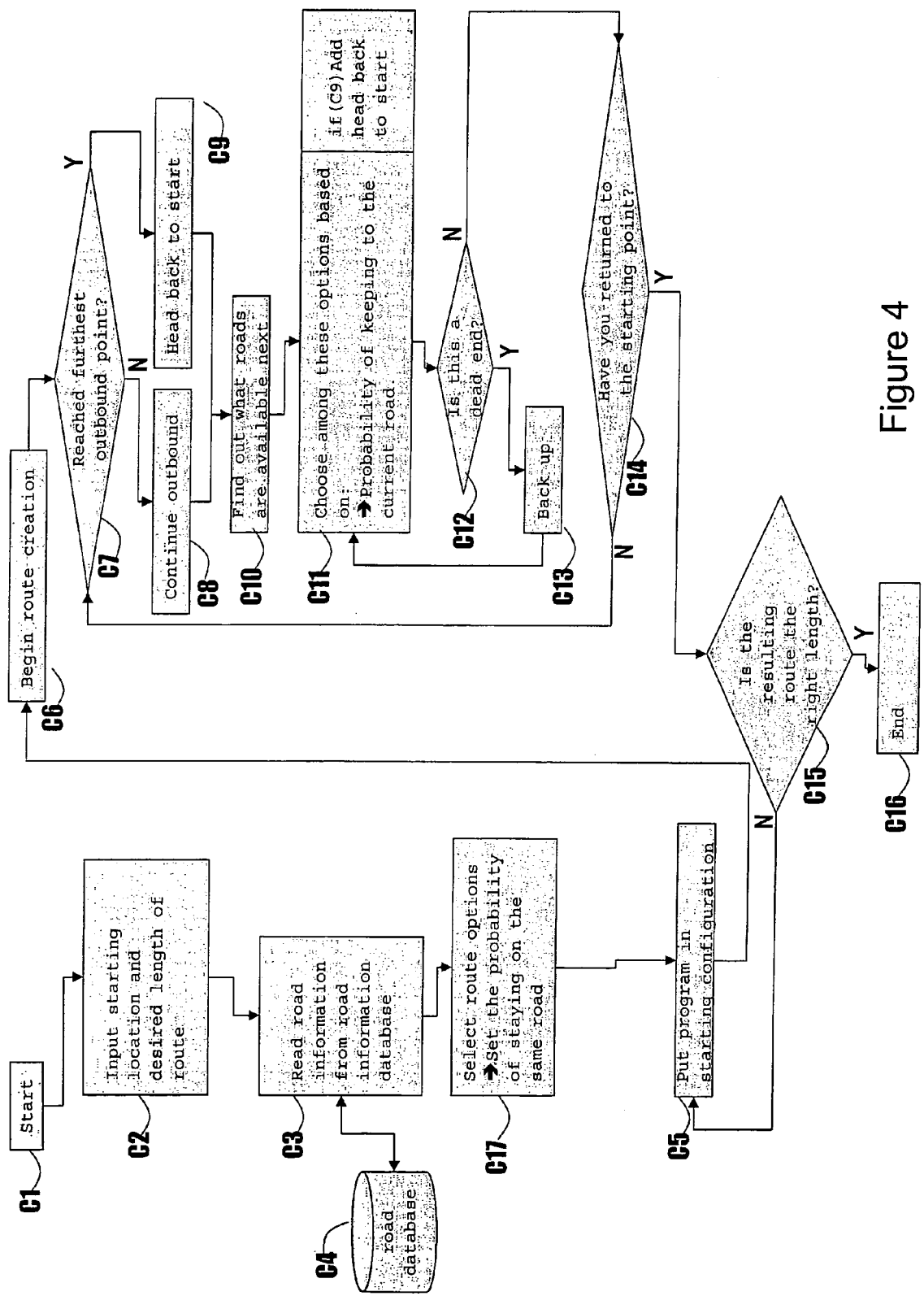
FIG. 4 illustrates a flow diagram of a travel route mapping algorithm with a preference for remaining on the same road.

The difference between FIG. 4 and FIG. 3 is in C17 and C11. First, in C17, the user sets the probability of remaining on a road with the current road's name. Then, in C11, when available options are being considered, the algorithm uses this probability to weight its probability of road selection. As previously, the C11 operation depends on the answer to C7. Once the furthest outbound point has been reached, so that the algorithm is creating the return path, the algorithm will still weight its choice so that it will remain on the same road when possible, but it also must add to that weighting an additional preference to head back to the starting point.

Heading in a Specific Geographic Direction

When the algorithm begins its operation as illustrated in FIG. 2 at step A11 it will choose roads to add to its route at random. Even if the algorithm is directed to remain on its current road, the general direction of the route will be determined by the random choices made at the outset, when no roads, or few roads, exist in the route.

The algorithm can also be prompted to select a route that heads in a general direction at the outset. So, for example, if the user would prefer a route that heads "generally north", the algorithm can be configured to act in this fashion.

Figure 5:
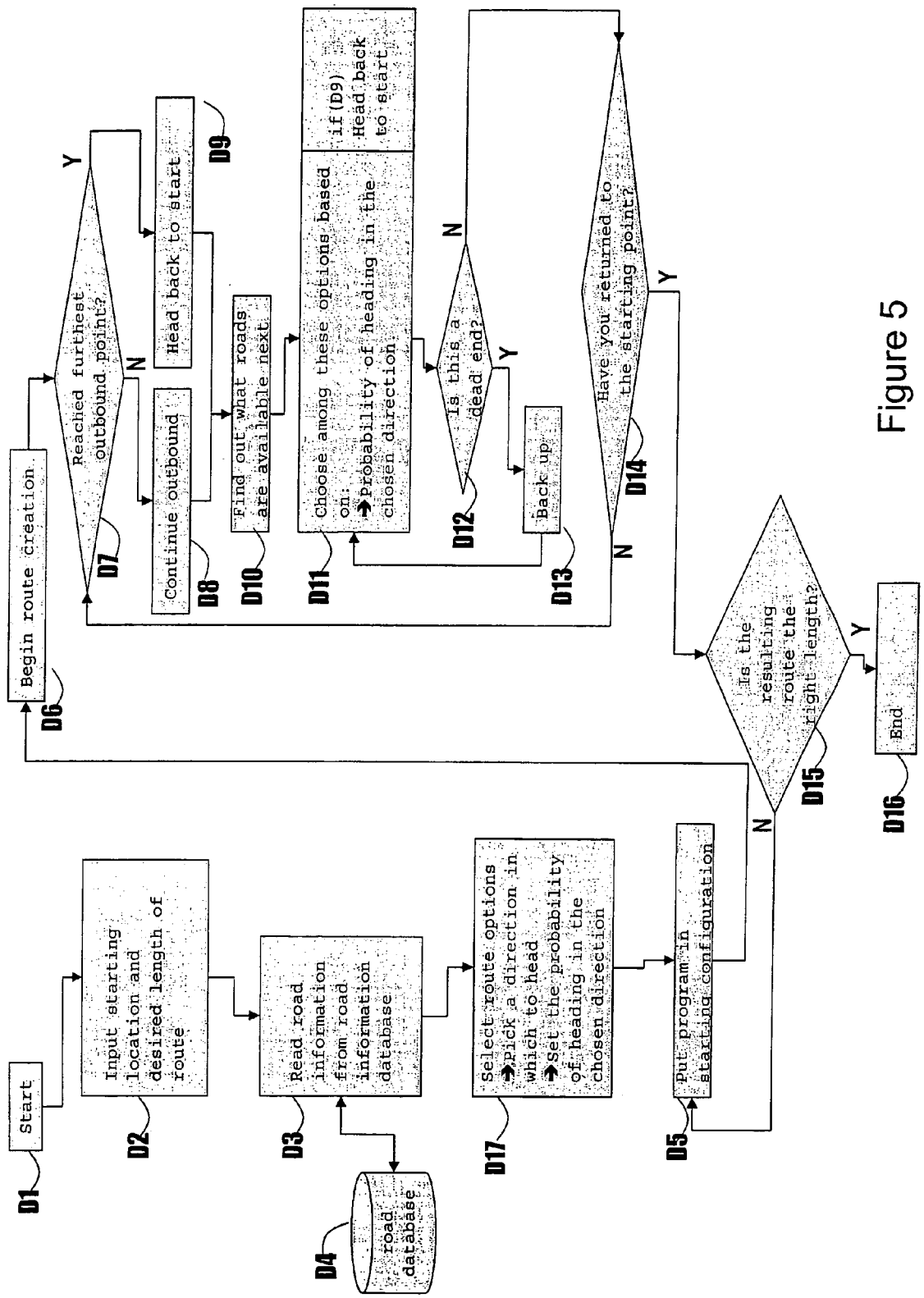
FIG. 5 illustrates a flow diagram of a travel route mapping algorithm with a designation of a specific geographic direction.

FIG. 5 illustrates how this enhancement works. At D17 the user can specify the general direction in which he would like the route to head at the outset, and the probability that the algorithm heads in that direction. At D11, when the available options are being examined, the algorithm uses the information from D17 to choose among roads that head in the general direction chosen. If the user specifies, for example, that the route should head north with a probability of 100%, then the algorithm will always choose from among its options the option that heads in the most northerly direction. (Recall that the routes use actual roads in the database, D4, and therefore cannot necessarily head exactly due north.) If the user specifies that the route should head north with a probability of only 75%, however, then the algorithm will select roads with a preference towards a northerly direction, but an element of randomness will remain in the result.

It should also be noted that the preference to head in a specific direction will only be imposed on the outbound path, that is, as the algorithm heads from D8 to D10 to D11. On the return path (D9 to D10 to D11) the algorithm must, of course, head back towards the origin. So, as in the above examples, the D11 operation depends on the answer to D7. In this case, though, there is no merging of the preference to head in a specific geographic direction and the preference to head in the direction of the starting point. Once the path through D9 is taken, the algorithm will make all road choices such that the route heads back to the starting point.

Setting, and Heading in the Direction of, Specific Target Locations

Another enhancement is the inclusion of intermediate targets that the route should attempt to include. This is very similar to the use of a preferred geographic direction, as described above. This enhancement is illustrated in the flow diagram of FIG. 6.

Figure 6:
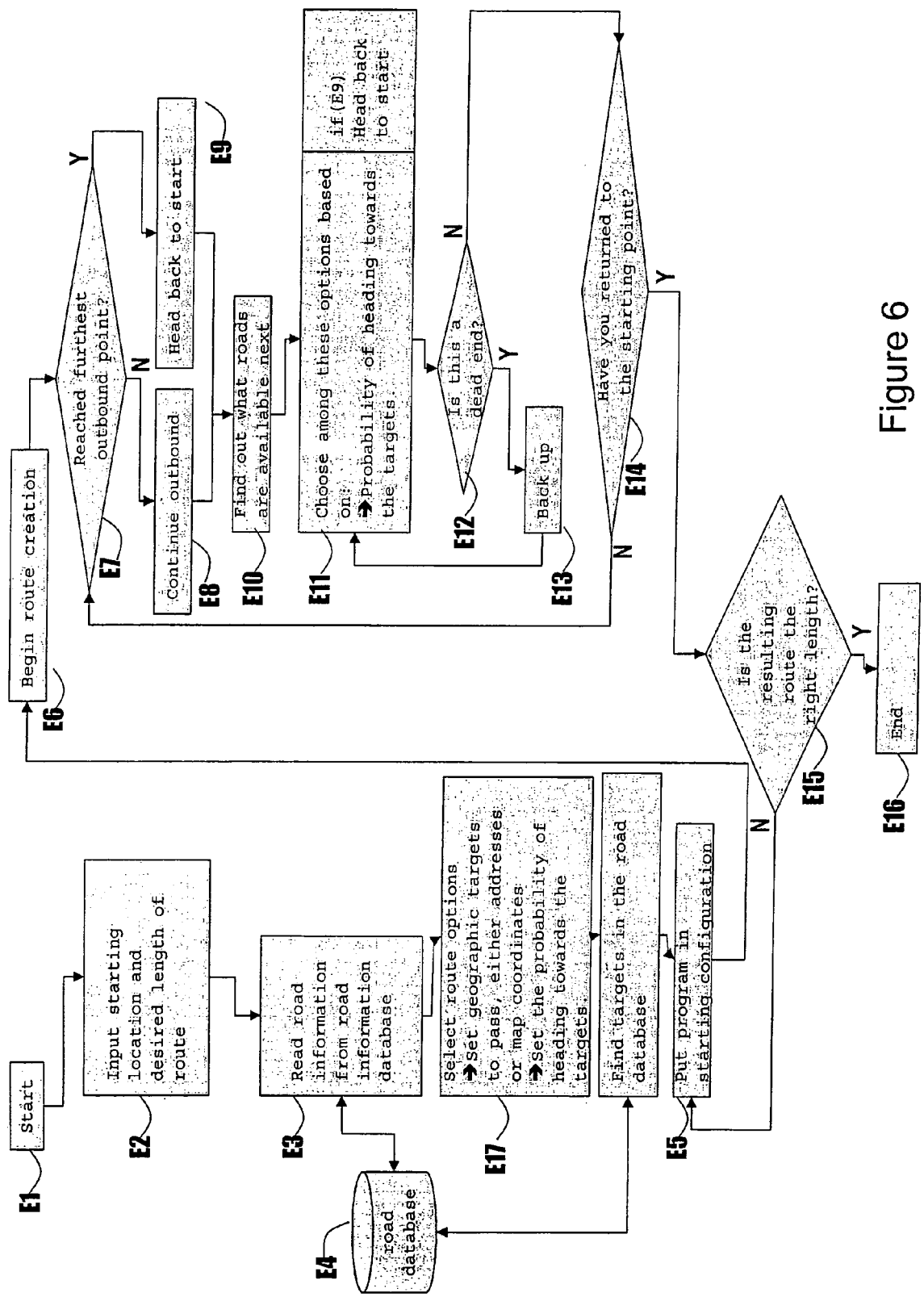
FIG. 6 illustrates a flow diagram of a travel route mapping algorithm with a designation of one or more specific target locations.

At E17 in FIG. 6 the user is able to insert a set of targets that the route should attempt to include. These can be in any format (address, geographical coordinates, etc.) and any number of them can be included. As with the choice of preferred direction, illustrated in FIG. 5, a probability figure can be included to determine the likelihood that the algorithm will head in the direction of these intermediate targets. As part of the E17 operation the algorithm must locate the target roads in the database.

At E11, when the available options are being considered, the algorithm bases its choice of road on the probability of heading towards the next intermediate target in its list. The targets are ordered as they are entered by the user, and the algorithm attempts to reach them in this order. Once a target is reached, the algorithm heads to the next target in the list. When all targets are exhausted, the algorithm will continue creating a route to meet the route length criterion set by the user.

It is important to remember, however, that the overriding goal of this algorithm is to create closed routes of specified length. If reaching these intermediate targets will cause the resulting route to be too long, the algorithm will stop heading towards the targets and begin heading back to the origin in order to complete the route within the specified distance limit. In this way, then, the intermediate targets can be considered to be suggested directions for the algorithm to use in choosing roads, but not required points that must be passed. So, like the above examples, the E11 operation depends on the answer to E7. However, once the furthest outbound point is reached the targets no longer play any role in the selection of roads. Once the path through E9 is taken, the algorithm will make all road choices such that the route heads back to the starting point.

Combinations of the Above

Figure 7:
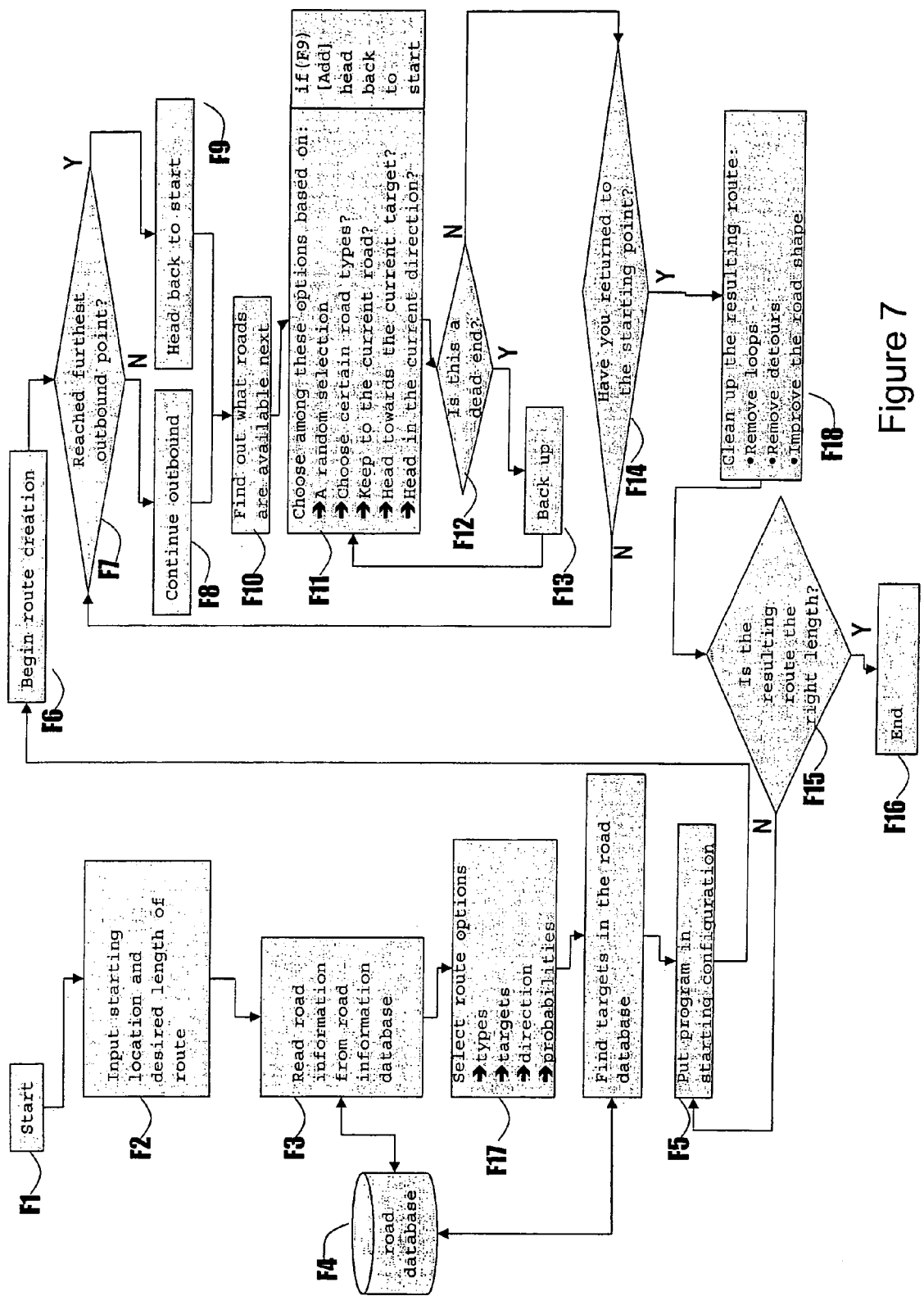
FIG. 7 illustrates a flow diagram of a travel route mapping algorithm with a combination of features shown in FIGS. 3–6.

We have described a number of enhancements to the basic algorithm outlined in FIG. 2, and we have treated these enhancements as separate operations. However, it is possible for a number of these enhancements to operate at the same time, as illustrated in FIG. 7.

For example, it very likely that a user would want to select the types of roads out of which the route is constructed (FIG. 3) while, at the same time, want to direct the resulting route to head at the outset in a specific direction (FIG. 5) while, when possible, remaining on roads with the same name as much as possible (FIG. 4). These combinations of enhancements, and others, are implied by what has been described here.

The operation at F11 is, in this case, a mixture of what has been described above. Some of the road selection operations (randomness, road type, keep to the current road, etc.) are relevant both in the outbound and the return road selection process. Others (geographic direction, targets) are relevant only in the outbound, not the return, direction. The mix of these various operations may, and in some cases must, shift throughout the creation of a single loop. For example, the requirement to head back towards the origin is not invoked until after the route reaches the maximum outbound distance. And, even once this happens, it is possible to require only loose adherence to that requirement when the route is far from the origin, while requiring tighter adherence as the route gets closer to finishing.

Route Manipulation

FIG. 7 also includes a new set of operations not described in the previous figures. These are represented by the box labeled F18. Because of the random aspect of this route creation algorithm, it is possible that the route created at F14 in FIG. 7 will have certain aspects that may be considered undesirable. Among these aspects are elements known as "loops" and "detours". These elements, and a description of how they can be addressed, are discussed below.

Figure 8:
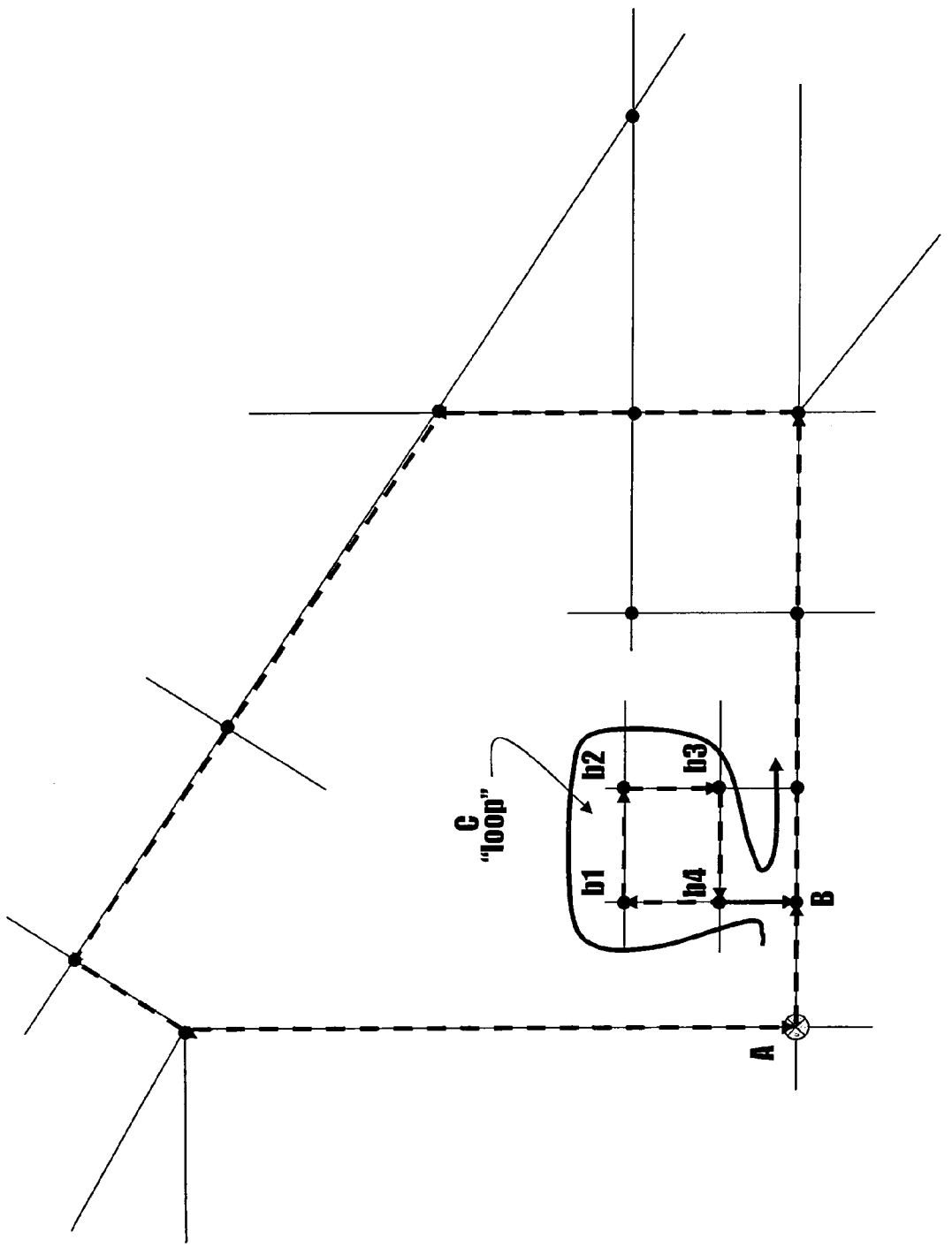
FIG. 8 shows a loop in an example route.

FIG. 8 shows what is meant by a "loop" in a route. A loop is created when the route contains a path that contains the same point at least twice. For example, in the route illustrated here the starting point is shown at A. The route progresses by moving from A to B. From point B, however, the route takes the following path: B→b1→b2→b3→b4→B before continuing on again. Since the point B is passed twice, this constitutes a loop.

There is nothing inherently "wrong" with a loop like this, however some users may choose to remove loops from the final route presented to them. This is done by allowing the user to specify the minimum size of any allowed loop. This would happen at F17 in FIG. 7. When the route has been created at F14, the algorithm at F18 would examine the route for the existence of loops. If the total length of any loop found is less than the minimum designated loop size, the algorithm will remove the loop from the final route presented to the user. So, for example, in the route in FIG. 8 the section constituting the loop would be removed before the final route is presented to the user.

Figure 9:
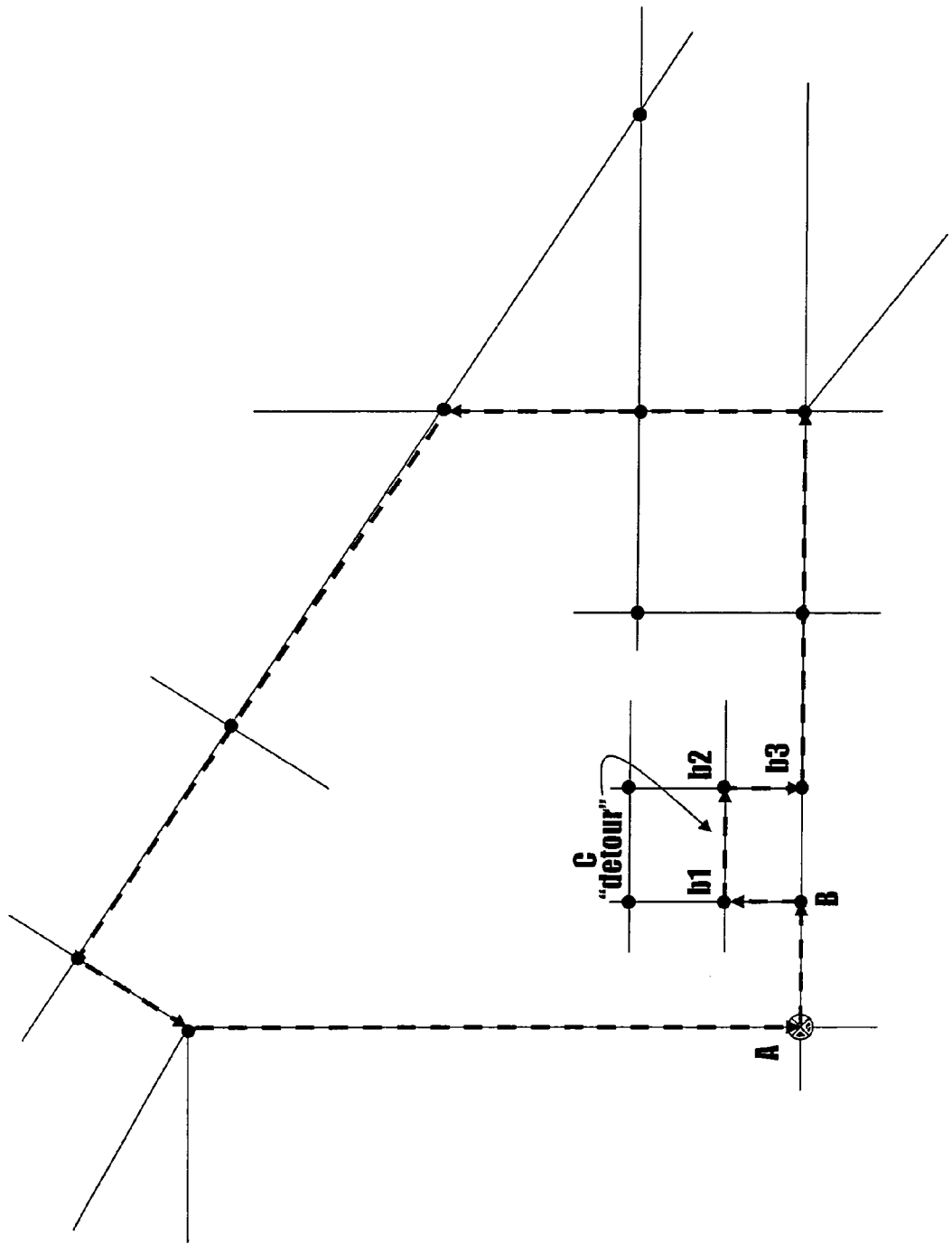
FIG. 9 shows a detour in an example route.

Detours, as depicted in FIG. 9, are very similar to loops as described above. A route may be generated in which the roads A→B, B→b1, b1→b2, and b2→b3 are used, when A→B, B→b3 would have been a perfectly acceptable path.

At F17 in FIG. 7 the user may have the ability to define a minimum detour that will be permitted in the final route. The route created at F14 is analyzed at F18 to determine if any detours exist. Any detours that are shorter in distance than the minimum allowed detour length would be eliminated from the final route presented to the user. So, for example, the final route in the case described here would include only the road from B→b3, not the intermediate roads as shown in FIG. 9.

Both loop and detour removal have the effect of removing length from the route presented to the user. This may result in making the route shorter than the requested length, which is why at F15 the resulting route length is checked against the requested route length. If the two lengths are too different, the algorithm will generate another route using the same inputs. The element of randomness contained in the algorithm means that different routes will be generated until one matching the criteria is found.

Detailed Example of Closed Route Creation

To illustrate the details of the route creation algorithms described above, this section presents a specific example of a route creation. This detailed example will be described in reference to FIG. 7 that shows the algorithm with enhancements beyond the basic mode. The example that will be shown creates a very short route with a very small number of total roads. However, it does help to illustrate the basic elements of what have been described in the above flowcharts.

Figure 10:
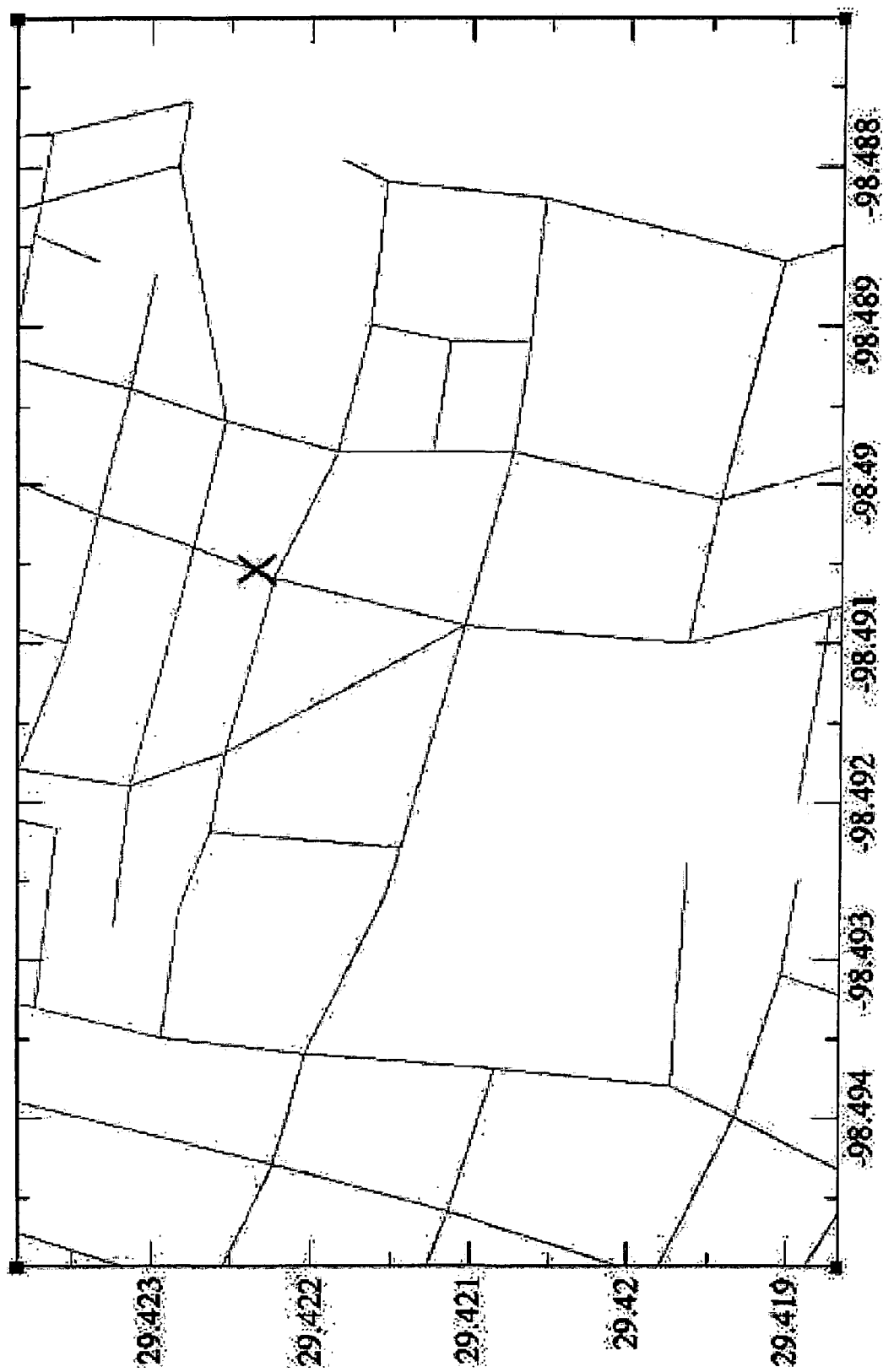
FIGS. 10–18 illustrate generation of an example outbound path.

FIG. 10 shows the status of the algorithm at position F6 in FIG. 7. The starting point has been entered along with the desired path length (F2), and the available roads have been read in at F3 from the database F4. In the figure, the bold "X" shows the starting point for the algorithm, and the lines in the figure show a set of roads that will be used to create the route.

Figure 11:
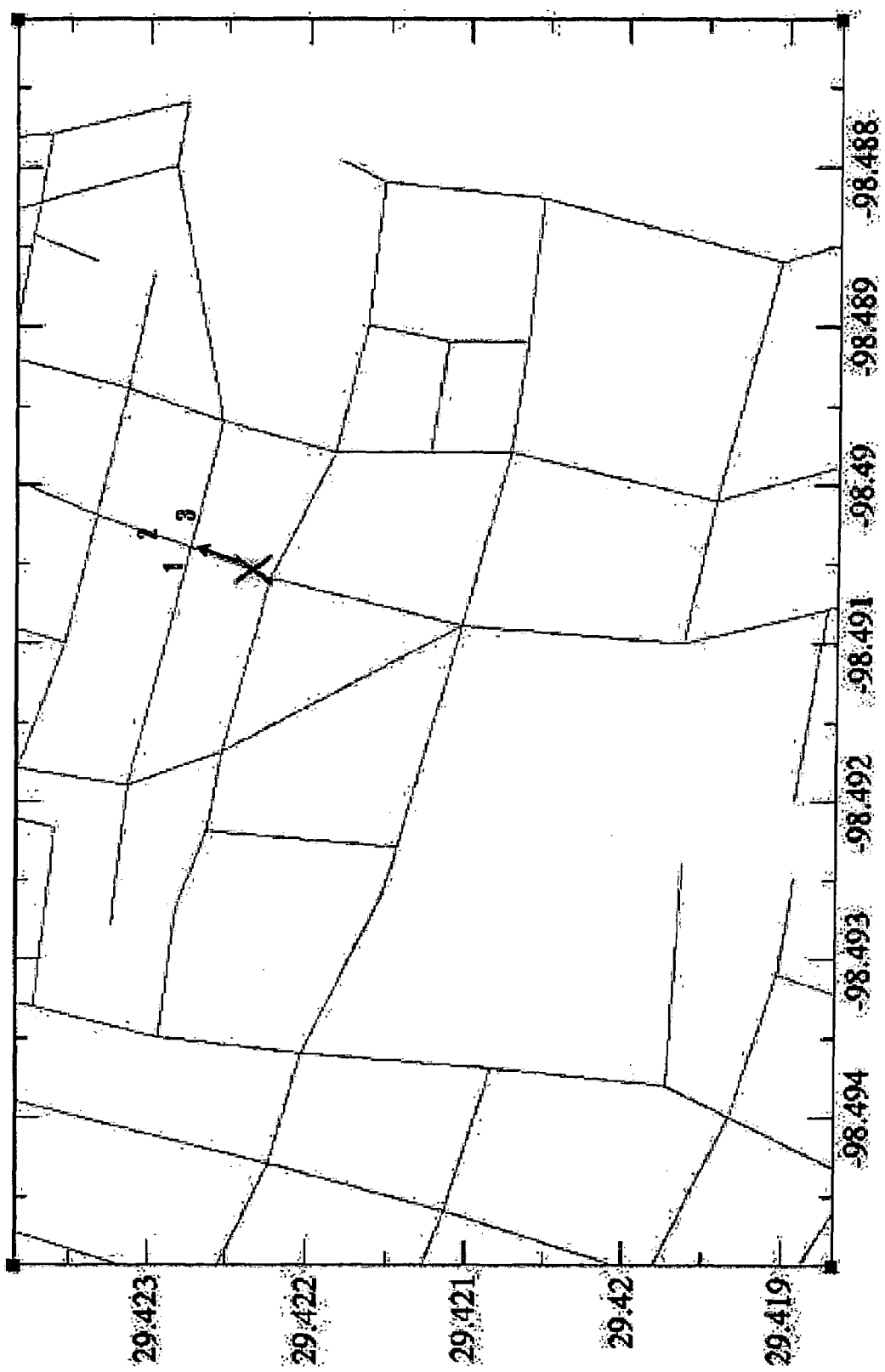

FIG. 11 shows the algorithm having reached F10 for the first time. The road containing the starting position has been found and the algorithm finds the options for the next roads that can be taken. Based on some combination of the selection options (F11), the algorithm chooses a new road to add to the current route.

Figure 12:
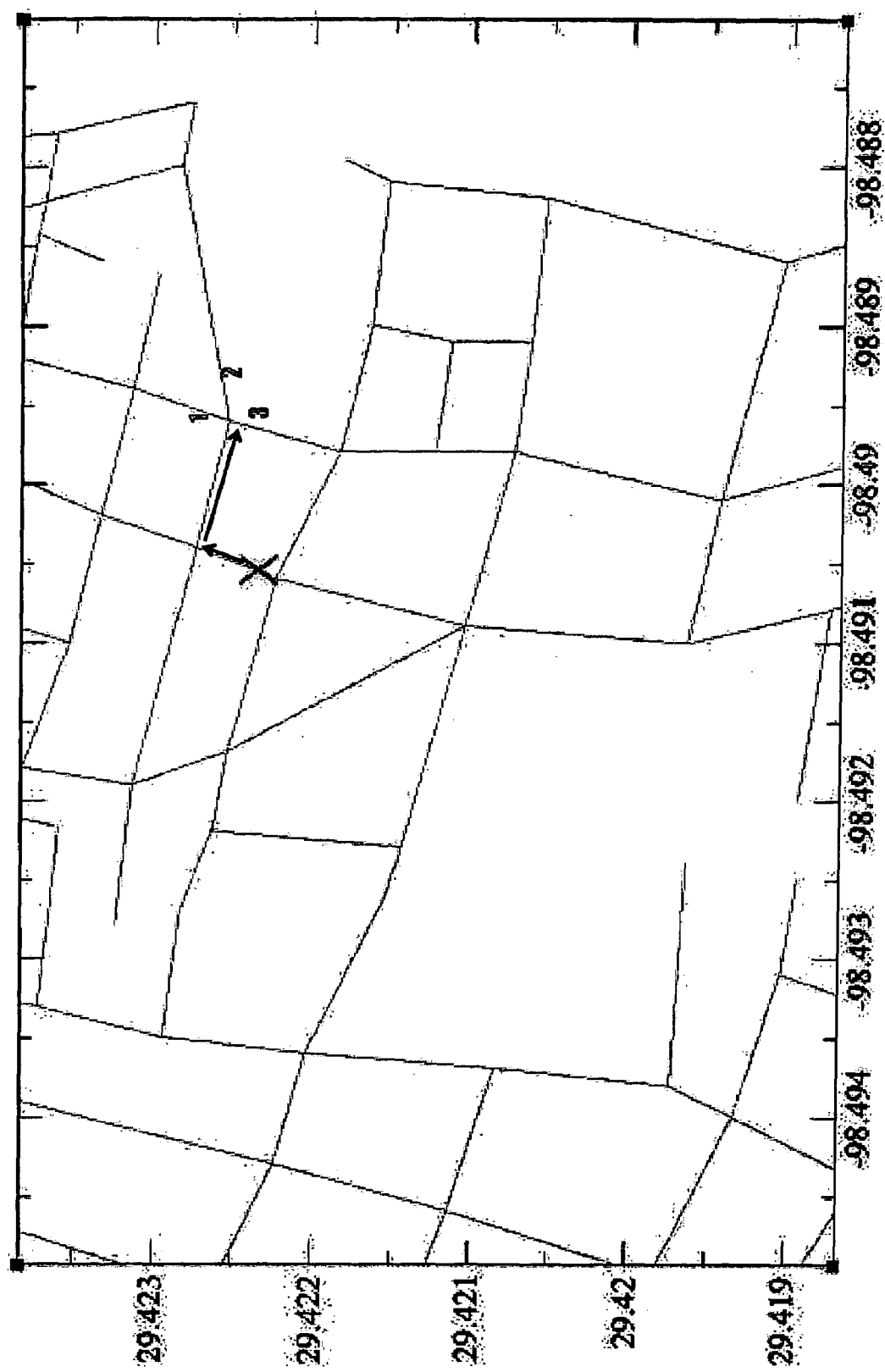
Figure 13:
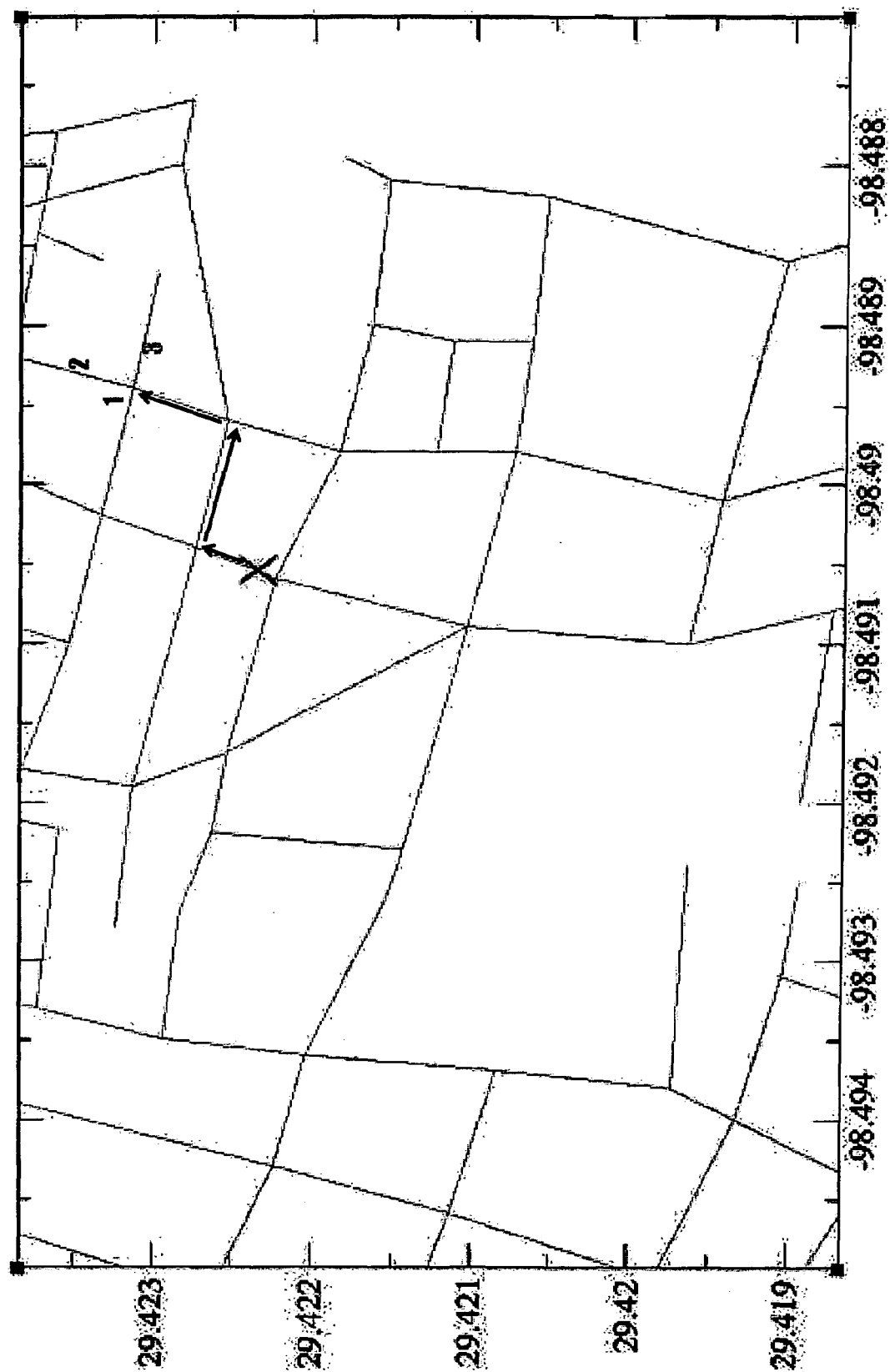

FIG. 12 shows the algorithm having made its selection of one of the road options shown in FIG. 11, having resolved the question F12 ("Is this a dead end?") in the negative, having resolved the question F14 ("Have you returned to the starting point?") in the negative and having moved back to F7. Since the answer to F7 ("Reached furthest outbound point?") is also "No", the algorithm proceeds to F8 and F10, and its state at that point is shown in FIG. 12. The algorithm continues in this loop (F7 to F14, and back to F7) until something happens to change this. FIG. 13 shows another road being added to the route using this process.

One of the things that can happen to break this flow is that, from among the possible road options, a dead end is chosen. This is shown in FIG. 14.

Figure 14:
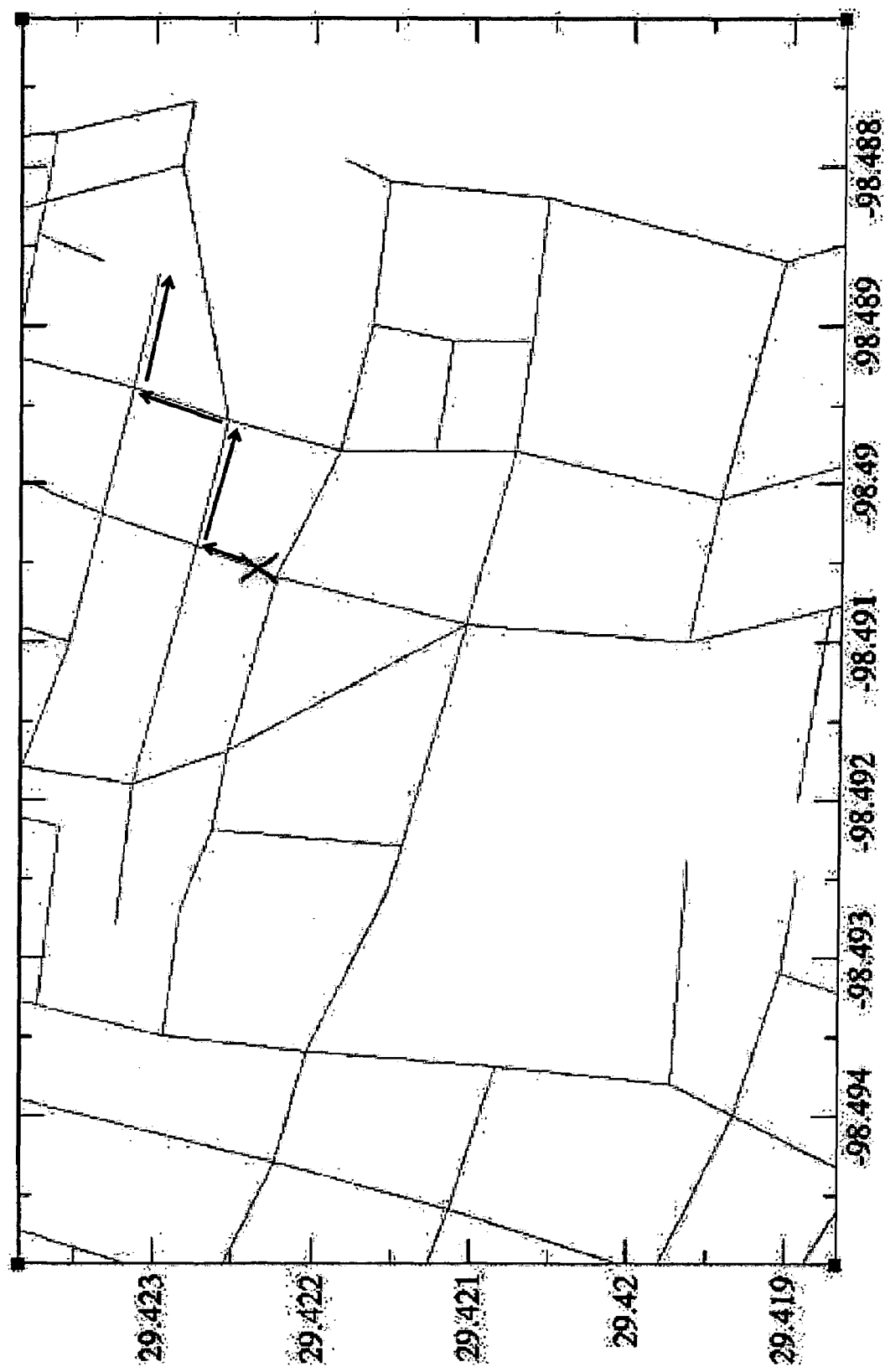
Figure 15:
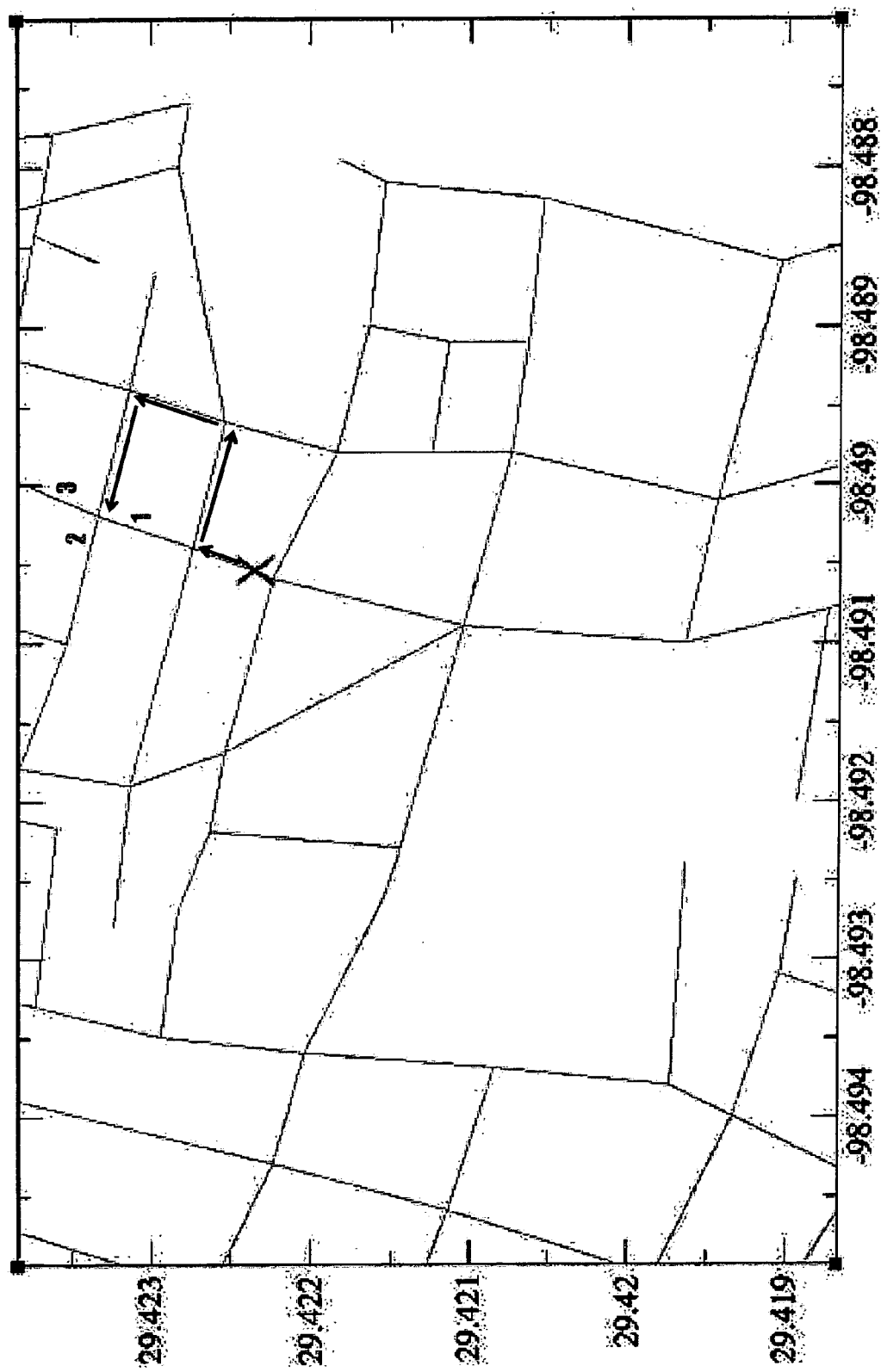

If the road chosen is a dead end, as in FIG. 14, the answer to the question in F12 of the algorithm ("Is this a dead end?") will be "Yes". In that case, the algorithm proceeds to F13, which removes the last road from the route and selects from the remaining options. (The option that was a dead end will have been removed from the list of possible options.) The effect of this is shown in FIG. 15.

Once the dead end is identified and a new road option (that is not a dead end) is chosen, the algorithm returns to its standard mode of operation, going to F14, F7, and finding new options available.

Figure 16:
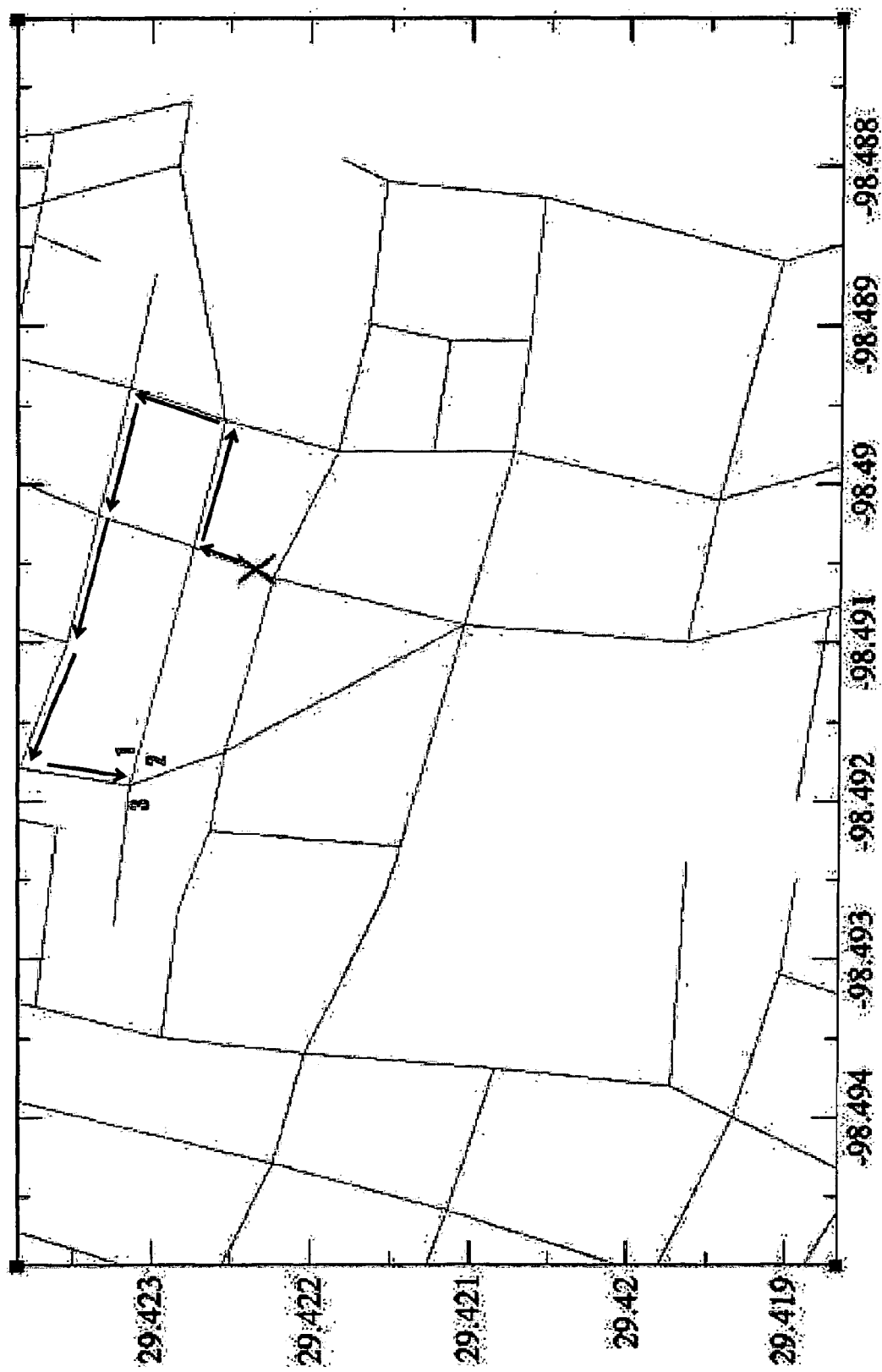
Figure 17:
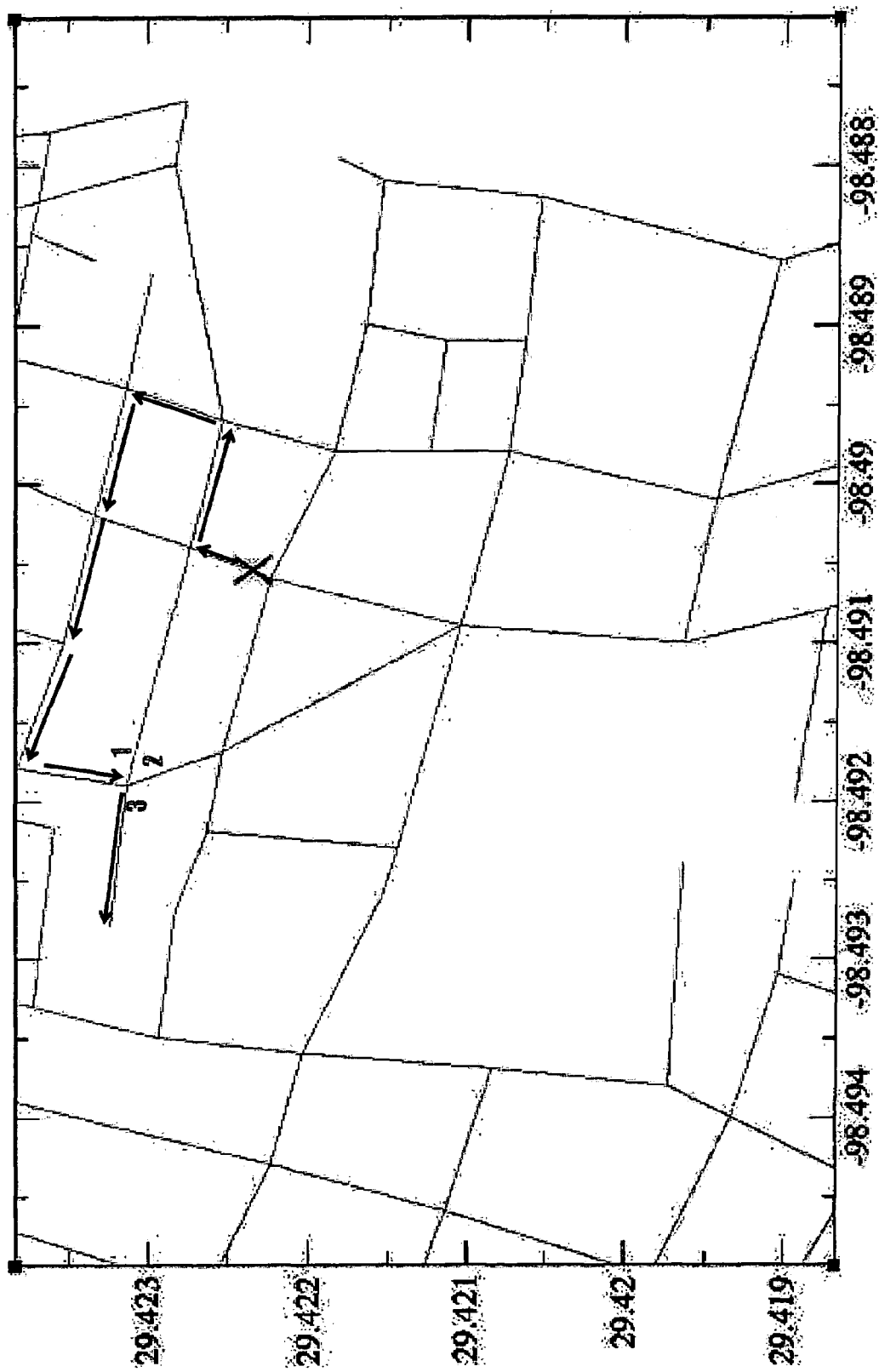

The following figures (FIG. 16, FIG. 17, and FIG. 18) show the algorithm continuing in this operation, selecting new roads, and avoiding dead ends.

Figure 18:
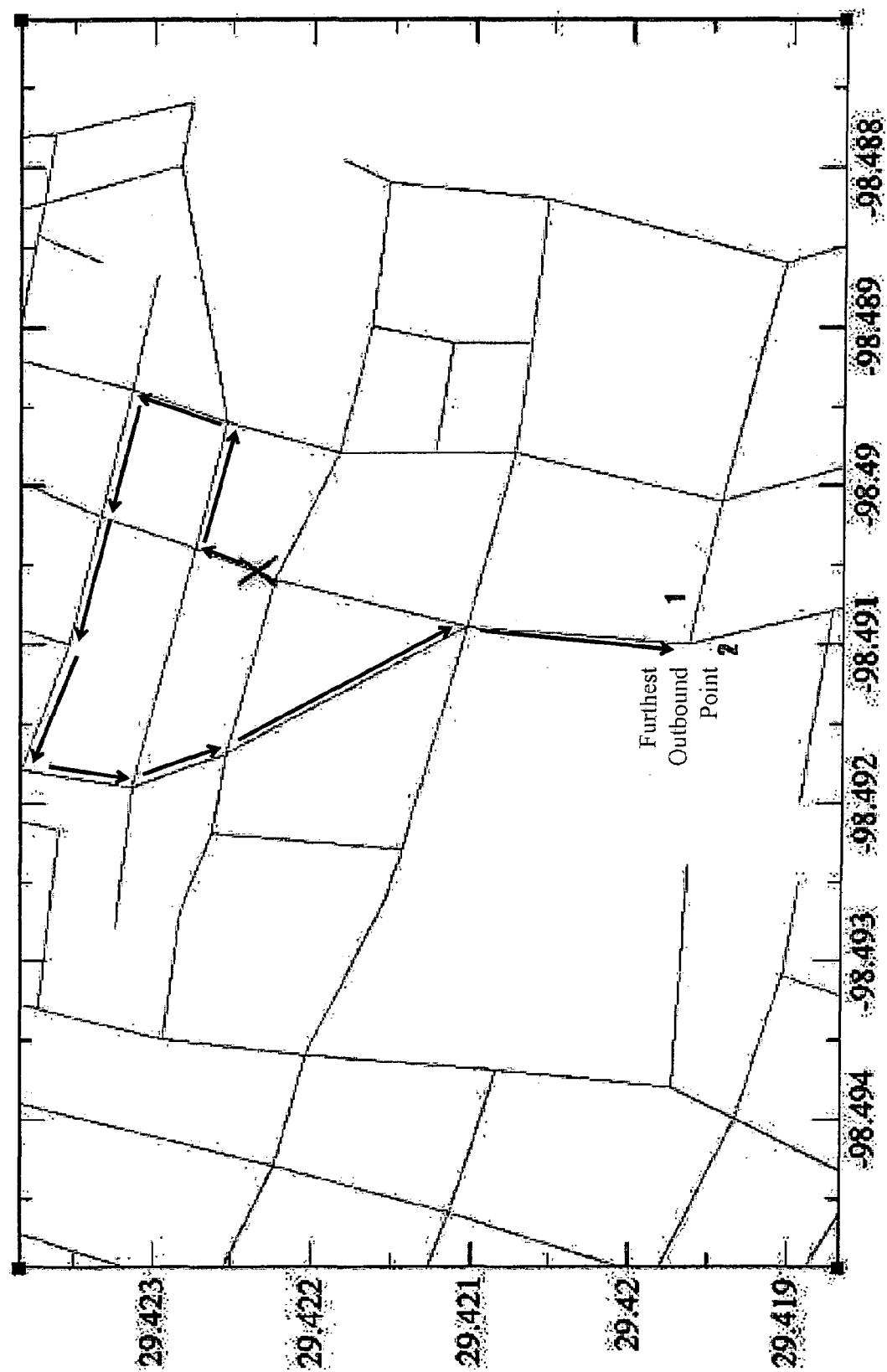

FIG. 18 includes a new state that will change the operation of the algorithm from what has been described so far. FIG. 18 illustrates a situation in which, when the algorithm returns to F7, it answers "Yes" to the question of whether it has reached the furthest outbound point. That the furthest outbound point has been reached may be determined any number of ways, but one simple implementation would be to say that for a loop of desired length LOOPLENGTH, the furthest outbound point is that point at which the length of the route is LOOPLENGTH/2. As described above, the general definition of the furthest outbound point is: the first point at which the sum of the existing path and the straight line distance back to the starting point equals, or exceeds, the desired route length.

Figure 19:
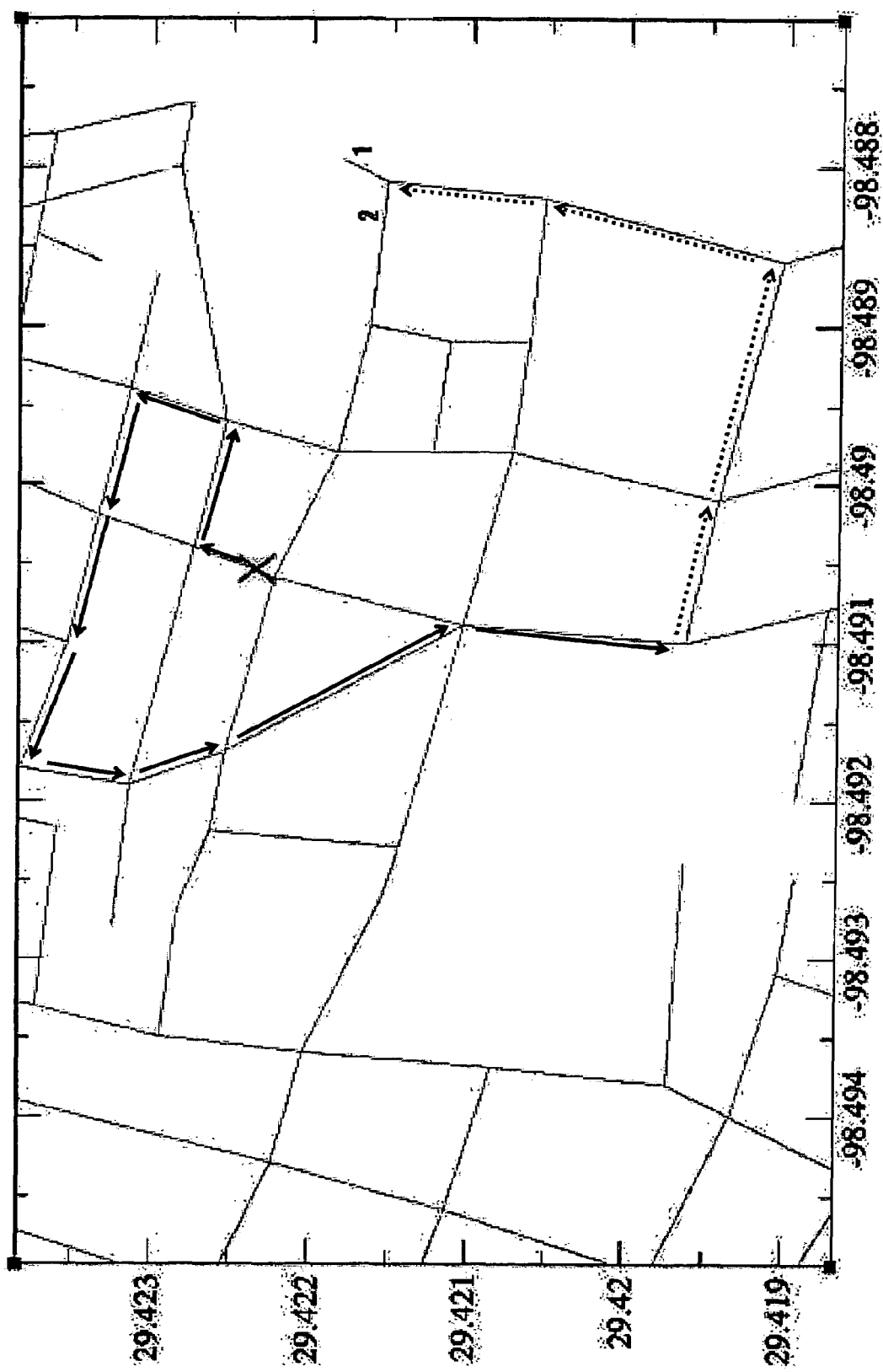
FIGS. 19–22 illustrate generation of an example inbound path.

Since the furthest outbound point has been reached, the algorithm now takes a different path through the flowchart, going from F7 to F9, which has an impact on the operation in F11. FIG. 18 shows two road options from which the algorithm can choose, but now, according to F11, the algorithm will weight that choice such that the route begins to head back to the starting point. The result of this selection, and several further selections is shown in FIG. 19. The choices made after the route has reached the furthest outbound point are designated by the dotted, as opposed to the solid, arrows.

FIG. 19 also demonstrates that the operation F11 does not mean that all choices after the furthest outbound point is reached will necessarily be in the direction of the starting point. The choices will be weighted in that direction so that the route will eventually close, but the element of randomness, which is one of the hallmarks of this invention, still remains.

Figure 20:
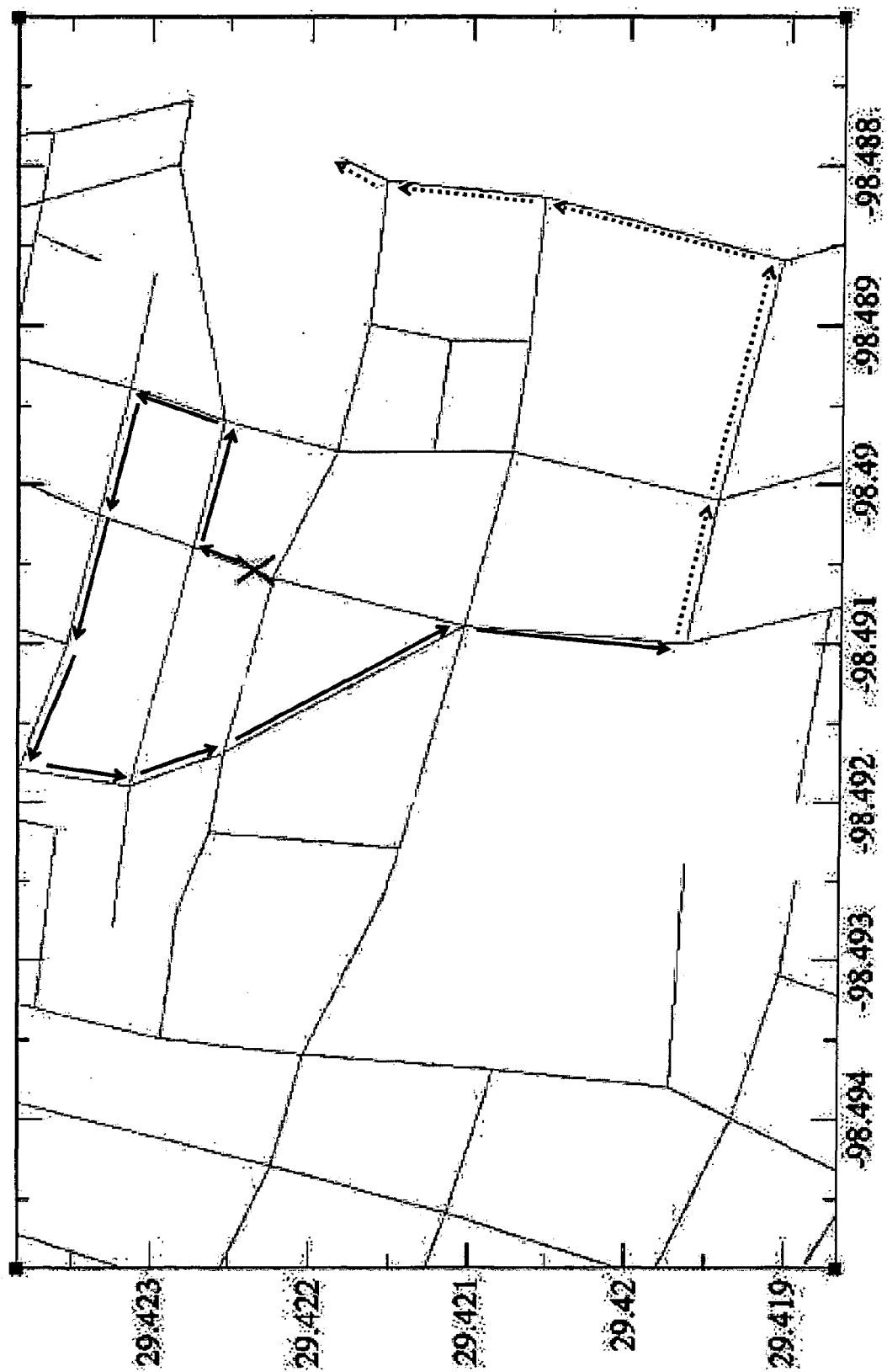
Figure 21:
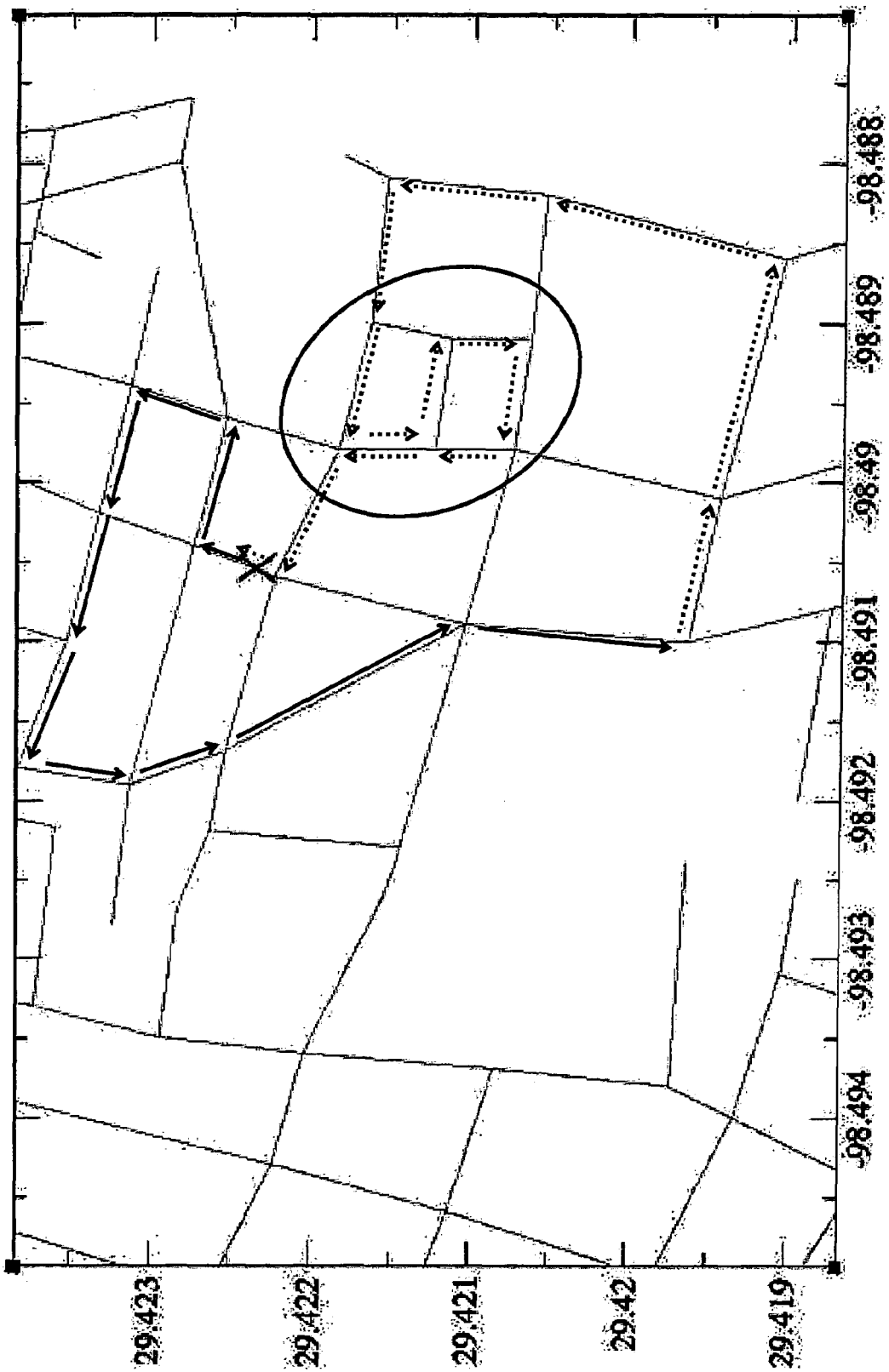
Figure 22:
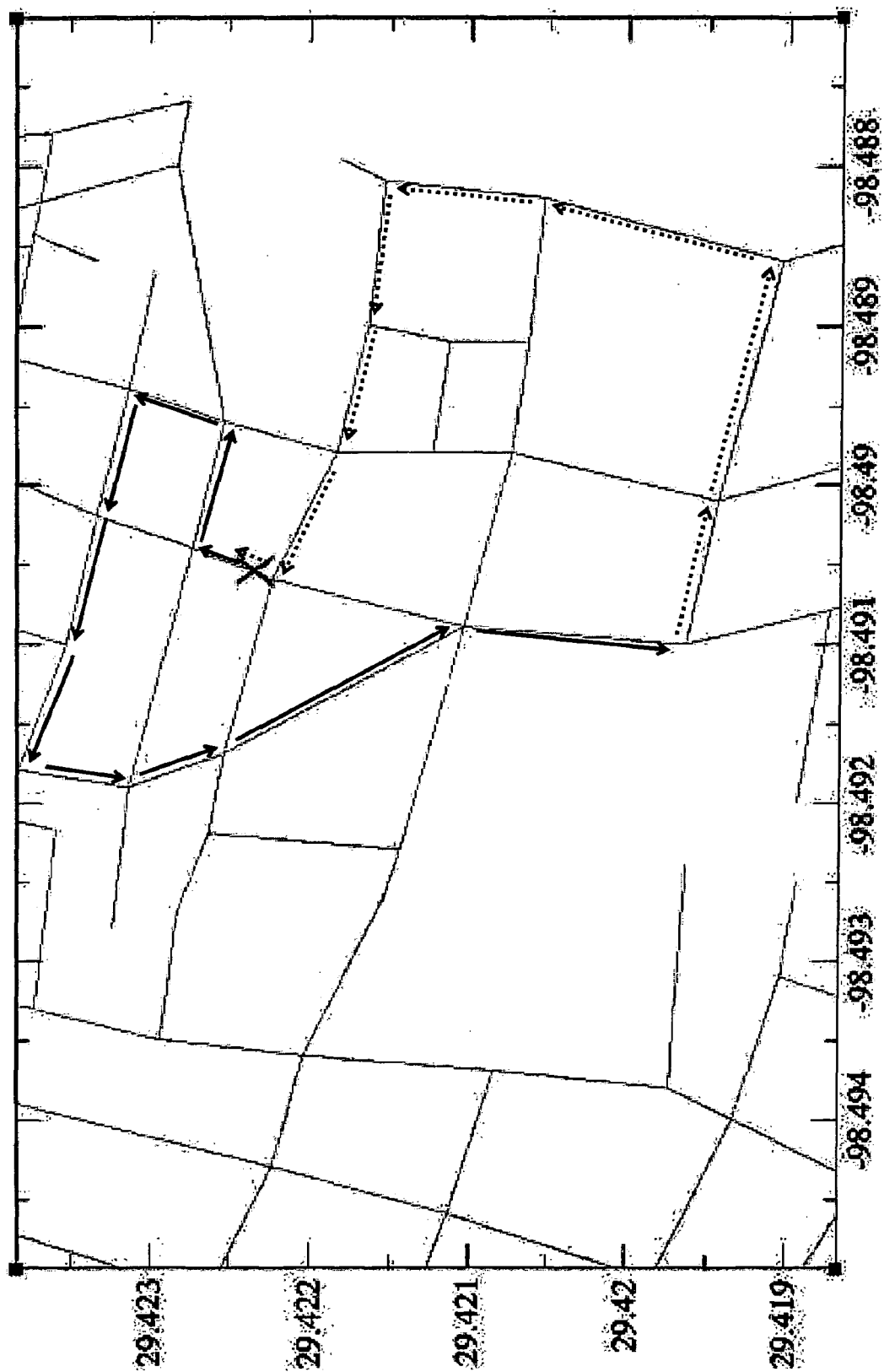

FIG. 20 shows that once the algorithm has fallen into the F7-F9-F10-F11 path, it continues as described before. Dead ends can still be encountered, and they are identified and removed via the F12-F13-F11 loop. FIG. 21 shows the route at completion (exiting F14), which will allow it to respond in the affirmative to F14 ("Have you returned to the starting point?") and, therefore, continue to F18 rather than returning to F7. The route in FIG. 21 contains what we have described above as a "loop", and that loop is highlighted by the oval in the figure. The operations identified in F18 will check to see if the loop is shorter than the minimum required length, and, if it is, will remove that loop from the final route. In the example being shown, that loop is too short, and the algorithm removes it from the route before that route is presented to the user. The route with this loop removed is shown in FIG. 22. As mentioned, the route in FIG. 22 will be shorter than that shown in FIG. 21, by the length of the loop that has been removed.

The final operation the algorithm would perform at this point is F15, in which it determines if the calculated route is an acceptable length. How it does this is not defined here, though there can be many ways. For example, the user may input an allowed deviation from the requested route distance in miles, as a percentage of the total route length, etc. Assuming that the route length is acceptable, the algorithm completes at F16, presenting the route information to the user.

Linear Route Creation

Loops Enclosing No Area

The descriptions of the algorithm above concentrate on its use to generate closed loops (starting and ending at the same point) in which the resulting route encloses a finite area. However, it is also possible to use the techniques disclosed here to operate in a point-to-point mode, with several variations.

Figure 23:
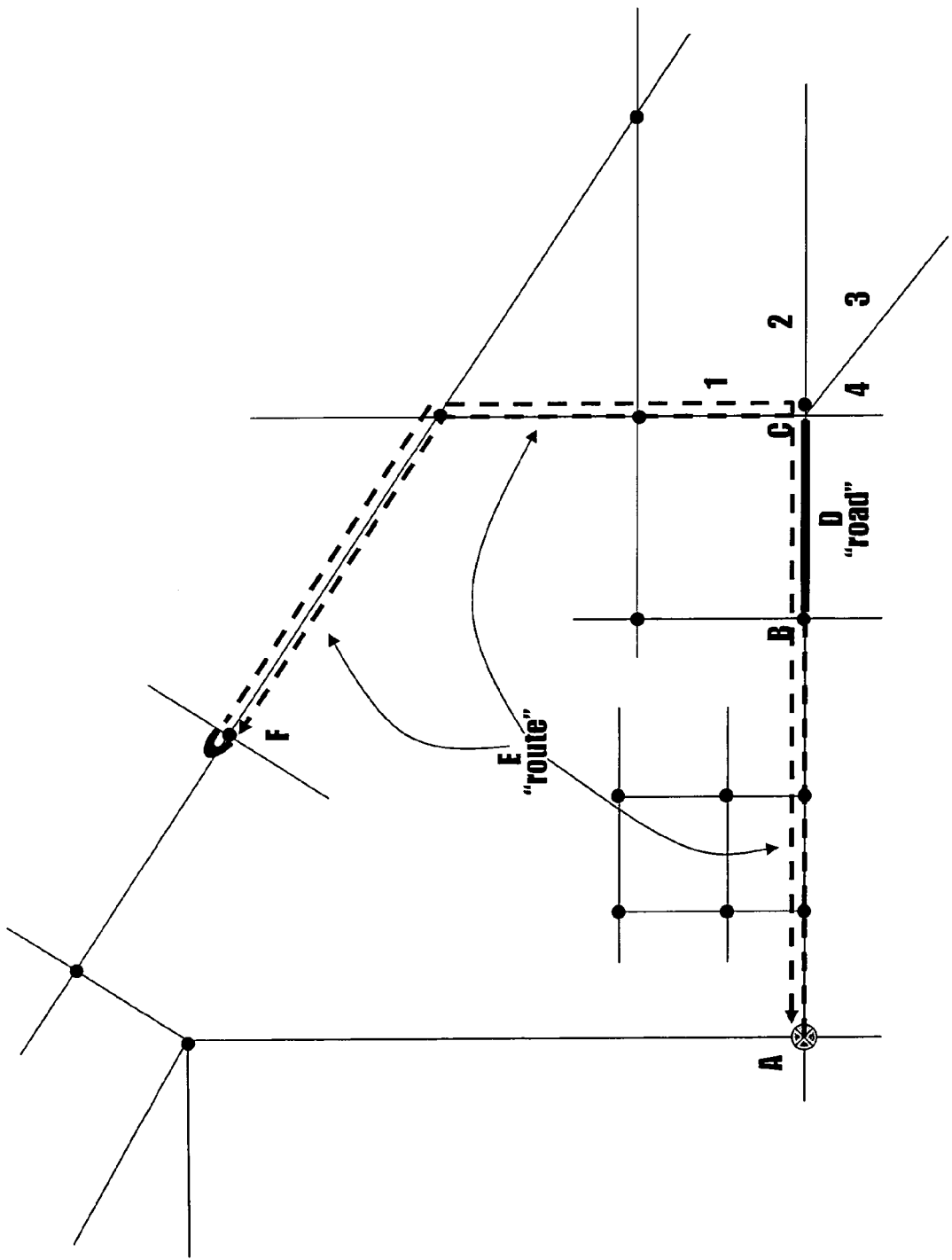
FIG. 23 illustrates an example closed route for which the outbound path and the inbound path use the same road segments in opposite directions.

The first variation is one in which the inputs to the algorithm remain the same (starting location and desired distance) but the algorithm is directed to use the same roads on the return path of its route. This is illustrated in FIG. 23.

All of the same techniques described above (road type selection, direction preference, target inclusion, loop removal, detour removal, etc.) can be applied to this mode of operation as well. The only difference is that once the algorithm recognizes that it is time to head back to the start (F9 in FIG. 7) it does not need to go through all the steps of F10, F11, F12, and F13. Rather, it simply uses the roads that already exist in the outbound path to create the return path.

The same advantages of this algorithm that have been described earlier remain in this scenario. That is, the user can input only the starting point and desired route length, and the algorithm will return a route with opposite outbound and return paths. Any given application of the algorithm will create a different route, so the element of randomness remains. That is, in FIG. 23 point F (the point at which this route turns around and heads back to point A) is not defined, and can be any point on any road that will allow for the creation of a route of the proper length.

Point to Point Operation

From the description of FIG. 23 it may also be clear that this algorithm can be used in a more typical point-to-point mode as well, and still continue to offer benefits not realized in other algorithms of this type. There are many examples of mapping algorithms described to operate in a point-to-point mode in which the user inputs both the starting and ending point desired, and the algorithm finds an appropriate route between the two. It is always the case, however, that for the same input parameters these algorithms will always return the same route to the user.

Figure 24:
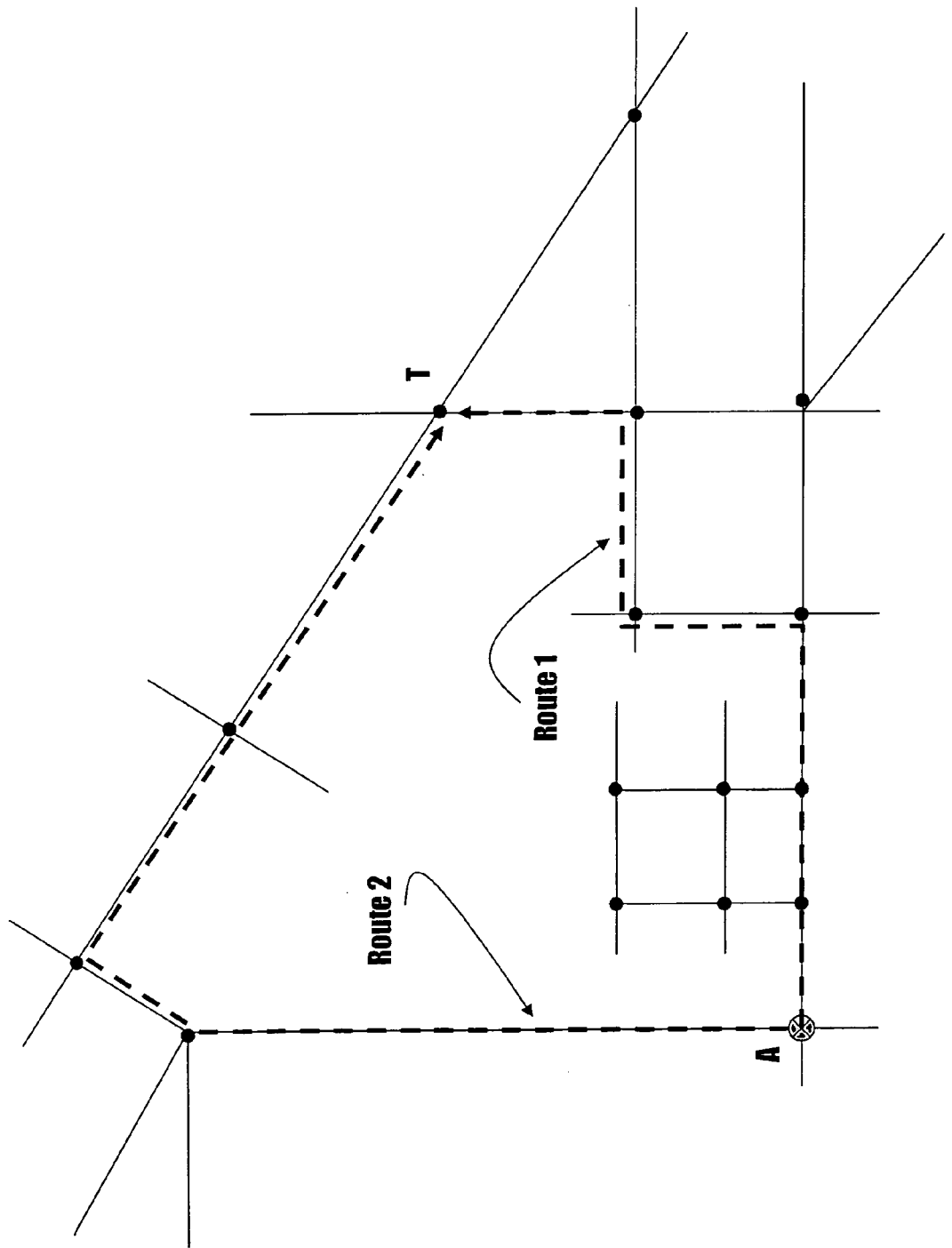
FIG. 24 illustrates an example of two different point-to-point routes generated from a starting point to a target point.

One of the primary advantages of the algorithm being described here is the element of randomness that it introduces into the calculation of a route. This element of randomness can also be useful in point to point operation. This is illustrated in FIG. 24.

In the same way that a user looking to generate a closed route for biking, jogging, walking, etc. might want different routes in order to add variety to these routines, the same may be said for a user who needs to travel between two points on a regular basis. For example, the user looking for the routes shown in FIG. 24 needs to travel between the starting point A and some target, T, regularly. The various elements described above can be used to generate multiple routes between these two points. The difference is that in this case the user does not input the desired route length directly. Rather, as in other route generation algorithms, the user inputs the starting point A, and the ending point T, directly. The description of the operation working in this mode is identical to the use of targets, as described in FIG. 6. In this case, however, once the target has been reached, the algorithm simply stops finding new roads, and returns the route that has been generated up until that point (the point at which the target was reached) to the user.

The same element of randomness can be brought to bear in this scenario as well, since the random choice of options at each intersection remains. FIG. 24 illustrates how two separate routes between points A and T can be generated.

Figure 25:
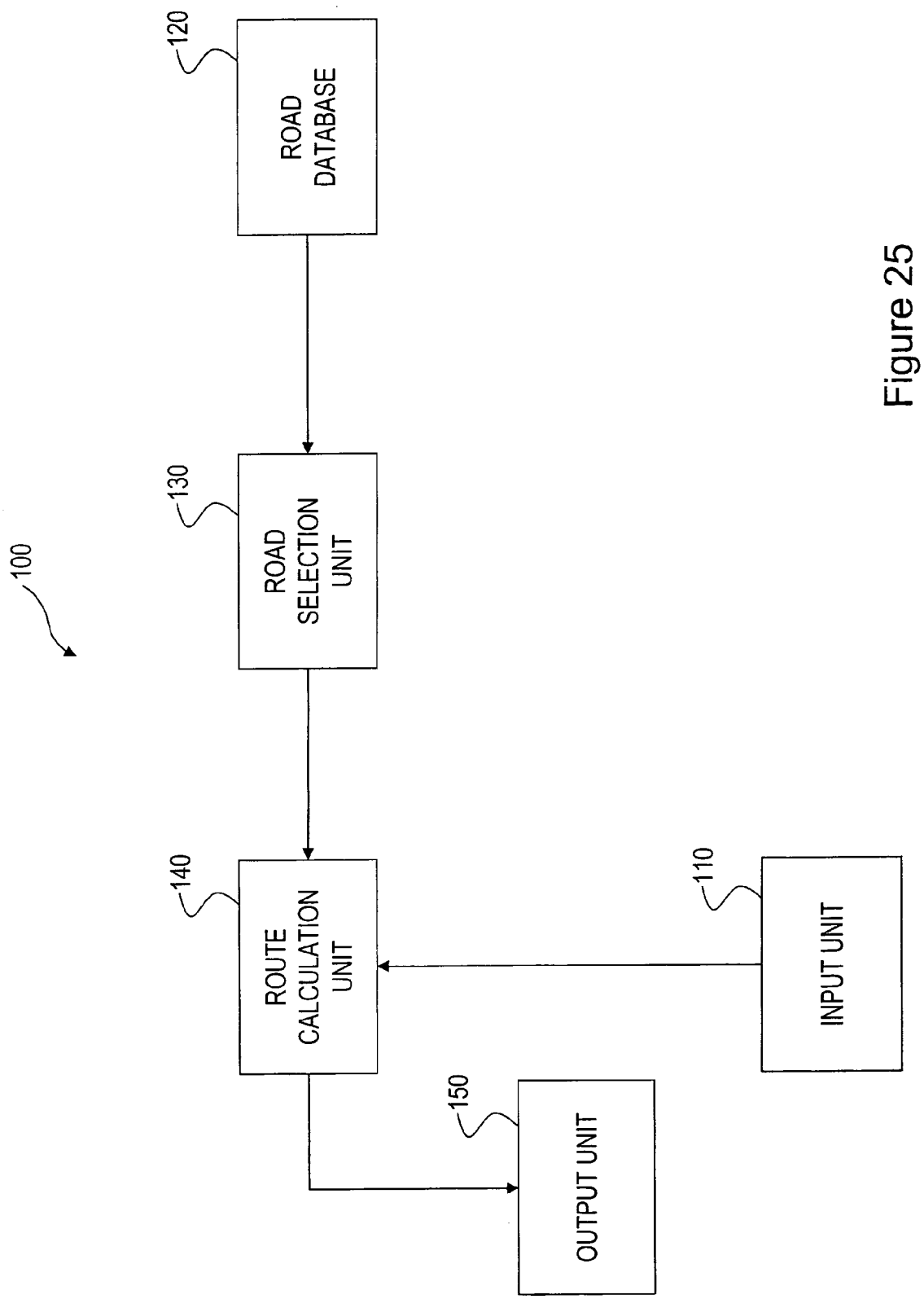
FIG. 25 is a block diagram of a first embodiment of a travel route mapping system in accordance with principles of the present invention.

FIG. 25 is a block diagram of a first embodiment of a travel route mapping system 100. An input unit 110 allows the entry of a starting point and a desired route length. Optionally at this point one can also enter route tuning parameters, such as weighting values for different types of roads, the direction that the route should take at the outset, target locations that the route should attempt to pass, etc. A road database 120 holds the list of roads and other geographic features upon which the system operates. Based on the input provided at input unit 110, a road selection unit 130 extracts roads from the database 120 that can be used in the creation of the final route. By using these roads and the other information provided at input unit 110, a route calculation unit 140 generates a route that satisfies the requirements of the user. Finally this route is presented to the user at output unit 150 in the form of a static map, an interactive map, a list of turn-by-turn roads (a "queue sheet"), etc.

Figure 26:
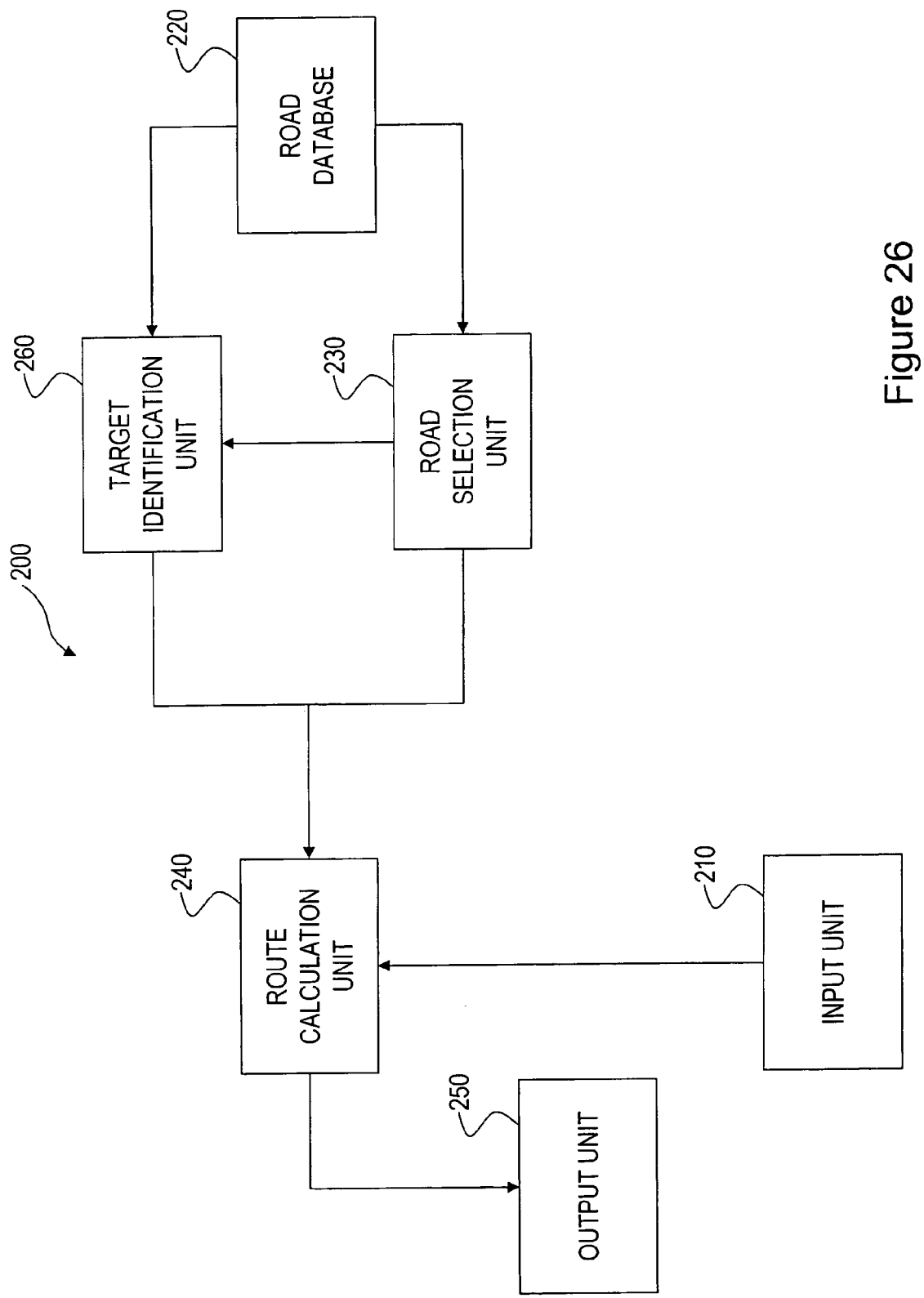
FIG. 26 is a block diagram of a second embodiment of a travel route mapping system in accordance with principles of the present invention.

FIG. 26 is a block diagram of a second embodiment of a travel route mapping system 200. An input unit 210 allows the entry of a starting point and a desired route length. Optionally at this point one can also enter route tuning parameters, such as weighting values for different types of roads, the direction that the route should take at the outset, target locations that the route should attempt to pass, etc. A road database 220 holds the list of roads and other geographic features upon which the system operates. Based on the input provided at input unit 210, a road selection unit 230 extracts roads from the database 220 that can be used in the creation of the final route. In parallel, and again based on the input provided at input unit 210, a target identification unit 260 identifies roads that the route should attempt to pass along its course. The target identification unit 260 checks to see if these targets correspond to roads that have already been extracted by the road selection unit. If not, the targets are also extracted from the road database 220 and placed into the list of selected roads. By using these roads, these targets, and the other information provided at input unit 210, a route calculation unit 240 generates a route that satisfies the requirements of the user. Finally this route is presented to the user at output unit 250 in the form of a static map, an interactive map, a list of turn-by-turn roads (a "queue sheet"), etc.

FIG. 27 illustrates a screen shot 300 from a graphical user interface for entering input information for use in the travel route mapping algorithm. Input route information includes starting location address 302, state 304, zip code 306 and requested route length 308. Optional input information 310 includes selection of return route type (same or new) 312; mode of directing the route (none, direction, target) 314; route initial direction (none, north, south, east, west) 316. Further optional information includes points of interest along the way 318; probability of taking the street in the chosen direction 320; probability of remaining on the current street 322; smallest acceptable loop length 324; and route length differential 326. It should be understood that other optional input information may be included as desired for other optional mapping features, such as minimum acceptable detour length.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of providing a closed route for travel, the method comprising:
   providing a database having geographic information;
   receiving input information including a starting point and a desired route length; and
   processing the geographic information from the database and the input information to define an outbound path from the starting point to a turning point, the turning point determined based on the desired route length, and to define an inbound path from the turning point to the starting point, the outbound path and the inbound path together defining the closed route.

2. The method of claim 1 further comprising:
   outputting a representation of the closed route.

3. The method of claim 2 wherein the representation includes a static map.

4. The method of claim 2 wherein the representation includes an interactive map.

5. The method of claim 2 wherein the representation includes a turn-by-turn listing.

6. The method of claim 1 wherein the geographic information includes a plurality of road segments each having a road segment length and wherein processing to define the outbound path includes:
   (a) selecting a road segment corresponding to the starting point as the current road segment;
   (b) cumulating the road segment length corresponding to the current road segment;
   (c) evaluating one or more selection criteria to select a road segment from among one or more road segments connected to the current road segment;
   (d) setting the selected road segment as the current road segment;
   (e) repeating (b), (c) and (d) until the cumulated road segment length plus the distance from the current road segment to the starting point is greater than or equal to the desired route length, the turning point corresponding to the most recently selected road segment; and
   (f) defining the outbound path from the series of selected road segments.

7. The method of claim 6 wherein the selection criteria includes selecting at random from among one or more road segments connected to the current road segment.

8. The method of claim 6 wherein the road segments each have a road type, the input information further includes a road type preference, and the selection criteria includes selecting from among one or more road segments connected to the current road segment based on the road type preference.

9. The method of claim 6 wherein the input information further includes a road continuity preference, and the selection criteria includes selecting from among one or more road segments connected to the current road segment based on the road continuity preference.

10. The method of claim 6 wherein the road segments each have a direction, the input information further includes a direction preference, and the selection criteria includes selecting from among one or more road segments connected to the current road segment based on the direction preference.

11. The method of claim 6 wherein the input information further includes one or more intermediate target points, and the selection criteria includes selecting from among one or more road segments connected to the current road segment based on proximity or direction to one or more of the intermediate target points.

12. The method of claim 6 wherein the road segments each have a road type, the input information further includes any combination of road type preference, road continuity preference, direction preference and one or more intermediate target points, and the selection criteria includes selecting from among one or more road segments connected to the current road segment based on any combination of road type preference, road continuity preference, direction preference, the intermediate target points and random selection.

13. The method of claim 1 wherein the geographic information includes a plurality of road segments and wherein processing to define the inbound path includes:
   (a) selecting the road segment corresponding to the turning point as the current road segment;
   (b) evaluating one or more selection criteria to select a road segment from among one or more road segments connected to the current road segment;
   (c) setting the selected road segment as the current road segment;
   (d) repeating (b) and (c) until the road segment corresponding to the starting point is selected; and (e) defining the inbound path from the series of selected road segments.

14. The method of claim 13 wherein the selection criteria includes selecting at random from among one or more road segments connected to the current road segment.

15. The method of claim 13 wherein the road segments each have a road type, the input information further includes a road type preference, and the selection criteria includes selecting from among one or more road segments connected to the current road segment based on the road type preference.

16. The method of claim 13 wherein the input information further includes a road continuity preference, and the selection criteria includes selecting from among one or more road segments connected to the current road segment based on the road continuity preference.

17. The method of claim 13 wherein the input information further includes one or more intermediate target points, and the selection criteria includes selecting from among one or more road segments connected to the current road segment based on proximity or direction to one or more of the intermediate target points.

18. The method of claim 13 wherein the road segments each have a road type, the input information further includes any combination of road type preference, road continuity preference and one or more intermediate target points, and the selection criteria includes selecting from among one or more road segments connected to the current road segment based on any combination of road type preference, road continuity preference, the intermediate target points, random selection and a preference to return the starting point.

19. The method of claim 1 further comprising:
defining another closed route if the absolute value of the difference between the length of the currently defined closed route and the desired route length is greater than a route length threshold.

20. The method of claim 1 wherein the geographic information includes a plurality of road segments and wherein processing to define the outbound and inbound paths includes:
selecting a first series of connected road segments from the starting point to the turning point; and
selecting a second series of connected road segments from the turning point to the starting point.

21. The method of claim 20 wherein selecting includes evaluating one or more selection criteria to select a road segment from among one or more road segments connected to a current road segment.

22. The method of claim 21 wherein the road segments each have a road type, the input information further includes any combination of road type preference, road continuity preference, direction preference and one or more intermediate target points, and the selection criteria includes selecting from among one or more road segments connected to the current road segment based on any combination of road type preference, road continuity preference, direction preference, the intermediate target points and random selection.

23. The method of claim 20 further comprising:
evaluating the defined closed route for the presence of loops;
removing from the defined closed route any loops having loop length less than a loop length threshold.

24. The method of claim 20 further comprising:
evaluating the defined closed route for the presence of detours;
removing from the defined closed route any detours having detour length less than a detour length threshold.

25. The method of claim 1 wherein the geographic information includes a plurality of road segments and wherein processing to define the outbound path includes selecting a first series of connected road segments from the starting point to the turning point at random.

26. The method of claim 25 wherein processing to define the inbound path includes selecting a second series of connected road segments from the turning point to the starting point at random with a weighted preference to return to the starting point.

27. The method of claim 25 wherein processing to define the inbound path includes selecting the first series of connected road segments in reverse order.

28. A system for providing a closed route for travel, the system comprising:
a database having geographic information;
an input unit for receiving input information including a starting point and a desired route length;
a road selection unit for extracting geographic information from the database;
a route calculation unit for processing the extracted geographic information and the input information to define an outbound path from the starting point to a turning point, the turning point determined based on the desired route length, and to define an inbound path from the turning point to the starting point, the outbound path and the inbound path together defining the closed route.

29. The system of claim 28 further comprising:
an output unit for outputting a representation of the closed route.

30. The system of claim 29 wherein the representation includes a static map.

31. The system of claim 29 wherein the representation includes an interactive map.

32. The system of claim 29 wherein the representation includes a turn-by-turn listing.

33. The system of claim 29 wherein the geographic information includes plural road segments and wherein the route calculation unit processes the road segments to define the outbound and inbound paths by:
selecting a first series of connected road segments from the starting point to the turning point; and
selecting a second series of connected road segments from the turning point to the starting point.

34. The system of claim 33 wherein selecting includes evaluating one or more selection criteria to select a road segment from among one or more road segments connected to a current road segment.

35. The system of claim 34 wherein the road segments each have a road type, the input information further includes any combination of road type preference, road continuity preference, direction preference and one or more intermediate target points, and the selection criteria includes selecting from among one or more road segments connected to the current road segment based on any combination of road type preference, road continuity preference, direction preference, the intermediate target points and random selection.

36. The system of claim 33 wherein the input information includes one or more intermediate target points and further comprising:
a target identification unit for identifying a listing of road segments corresponding to the intermediate target points;

wherein the route calculation unit processes the listing of road segments to select from among one or more road segments connected to a current road segment based on proximity or direction to the intermediate target points.

37. An article of manufacture comprising a computer usable medium having computer readable program code means embodied therein for:
- receiving input information including a starting point and a desired route length; and
- processing geographic information from a database and the input information to define an outbound path from the starting point to a turning point, the turning point determined based on the desired route length, and to define an inbound path from the turning point to the starting point, the outbound path and the inbound path together defining the closed route.

38. A system for providing a closed route for travel, the system comprising:
- means for providing geographic information;
- means for receiving input information including a starting point and a desired route length; and
- means for processing the geographic information and the input information to define an outbound path from the starting point to a turning point, the turning point determined based on the desired route length, and to define an inbound path from the turning point to the starting point, the outbound path and the inbound path together defining the closed route.

* * * * *